(12) United States Patent
Hill et al.

(10) Patent No.: US 10,458,589 B2
(45) Date of Patent: Oct. 29, 2019

(54) SOUND SUPPRESSION APPARATUS

(71) Applicant: AAF Ltd., Northumberland (GB)

(72) Inventors: James Matthew Hill, Cramlington (GB); Colin Alexander Malecki, Cramlington (GB); Paul Timothy Williams, Cramlington (GB); Mats Abom, Jarfalla (SE); Raymond Kirby, Middlesex (GB)

(73) Assignee: AAF Ltd., Northumberland (GB)

( * ) Notice: Subject to any disclaimer, the term of this patent is extended or adjusted under 35 U.S.C. 154(b) by 240 days.

(21) Appl. No.: 15/500,948

(22) PCT Filed: Jul. 15, 2015

(86) PCT No.: PCT/EP2015/066153
§ 371 (c)(1),
(2) Date: Feb. 1, 2017

(87) PCT Pub. No.: WO2016/020159
PCT Pub. Date: Feb. 11, 2016

(65) Prior Publication Data
US 2017/0219153 A1 Aug. 3, 2017

(30) Foreign Application Priority Data

Aug. 6, 2014 (GB) .................................. 1413979.4

(51) Int. Cl.
*F16L 55/033* (2006.01)
*F24F 13/24* (2006.01)
(Continued)

(52) U.S. Cl.
CPC .............. *F16L 55/033* (2013.01); *F01N 1/02* (2013.01); *F01N 1/04* (2013.01); *F01N 1/08* (2013.01);
(Continued)

(58) Field of Classification Search
CPC .... G10K 11/16; G10K 11/172; G10K 11/161; F01N 1/04; F01N 1/085; F01N 2240/20;
(Continued)

(56) References Cited

U.S. PATENT DOCUMENTS 2,855,039 A * 10/1958 Gross .................... E04B 1/8209
160/236
2,916,101 A * 12/1959 Naman ............. F16L 55/02754
181/224

(Continued)

FOREIGN PATENT DOCUMENTS

DE   3224241 A1 * 2/1983 .............. F24F 13/24
FR   2376994 A1   8/1978
(Continued)

OTHER PUBLICATIONS

International Search Report and Written Opinion issued by the European Patent Office regarding International Application No. PCT/EP2015/066153 dated Oct. 19, 2015, 12 pages.
(Continued)

*Primary Examiner* — Edgardo San Martin
(74) *Attorney, Agent, or Firm* — Haynes and Boone, LLP

(57) ABSTRACT

A sound suppression apparatus for installation inside a gas transport duct is provided. The sound suppression apparatus comprises a resistive sound-absorbing element (110) and a housing providing a reactive sound-attenuating element (130) communicating with a surrounding of the apparatus via opening in an outer surface of the housing. An outer surface of the sound suppression apparatus comprises an outer surface of the resistive sound-absorbing element and the outer surface of the housing. A gas transport duct comprising the sound suppression apparatus is also provided.

32 Claims, 13 Drawing Sheets

(51) Int. Cl.
| | |
|---|---|
| *G10K 11/172* | (2006.01) |
| *G10K 11/16* | (2006.01) |
| *F01N 1/08* | (2006.01) |
| *G10K 11/175* | (2006.01) |
| *F01N 1/02* | (2006.01) |
| *F01N 1/04* | (2006.01) |
| *F01N 1/10* | (2006.01) |
| *F01N 1/24* | (2006.01) |
| *F02M 35/12* | (2006.01) |

(52) U.S. Cl.
CPC ............... *F01N 1/085* (2013.01); *F01N 1/10* (2013.01); *F01N 1/24* (2013.01); *F02M 35/12* (2013.01); *F16L 55/0331* (2013.01); *F16L 55/0336* (2013.01); *F24F 13/24* (2013.01); *G10K 11/161* (2013.01); *G10K 11/172* (2013.01); *G10K 11/175* (2013.01); *F01N 2240/20* (2013.01); *F01N 2490/20* (2013.01); *F02M 35/1216* (2013.01); *F24F 2013/242* (2013.01); *F24F 2013/245* (2013.01)

(58) Field of Classification Search
CPC . F16L 55/033; F16L 55/0331; F16L 55/0336; F02M 35/12; F02M 35/1211; F02M 35/1233; F02M 35/1255; F02M 35/1266; F24F 13/24; F24F 2013/242; F24F 2013/245
See application file for complete search history.

(56) References Cited

U.S. PATENT DOCUMENTS

| | | | |
|---|---|---|---|
| 3,033,307 A | | 5/1962 | Sanders et al. |
| 3,776,364 A | * | 12/1973 | Van Doeren ............ F01N 1/003 181/228 |
| 4,150,732 A | | 4/1979 | Hoch et al. |
| 4,260,037 A | | 4/1981 | Eline |
| 4,263,982 A | | 4/1981 | Feuling |
| 4,330,047 A | * | 5/1982 | Ruspa ...................... F24F 13/08 181/224 |
| 4,993,512 A | * | 2/1991 | Lescher .................... F01N 1/02 181/227 |
| 5,869,792 A | | 2/1999 | Allen et al. |
| 6,116,375 A | * | 9/2000 | Lorch .................. G10K 11/172 181/224 |
| 6,622,818 B2 | * | 9/2003 | Jenvey ...................... F01N 1/24 181/224 |
| 6,799,657 B2 | * | 10/2004 | Daniels ................. F04B 53/002 181/175 |
| 7,104,749 B2 | * | 9/2006 | Frutschi .................. F02C 7/045 181/214 |
| 7,401,682 B2 | * | 7/2008 | Proscia ................... F02K 1/827 181/214 |
| 7,784,283 B2 | * | 8/2010 | Yu ............................. F02K 1/04 181/213 |
| 8,464,831 B2 | * | 6/2013 | Olander Burak ..... F01D 25/162 181/290 |
| 2012/0160603 A1 | * | 6/2012 | Braybrook .............. E06B 9/386 181/294 |
| 2018/0238583 A1 | * | 8/2018 | Jeong ...................... F24F 13/24 |

FOREIGN PATENT DOCUMENTS

| | | |
|---|---|---|
| FR | 2378176 A | 8/1978 |
| GB | 1196465 A | 6/1970 |
| GB | 1594382 A1 | 7/1981 |
| GB | 2122256 A1 | 1/1984 |
| GB | 2487320 A | 7/2012 |
| JP | H01-302060 A | 6/1989 |
| JP | H01-296040 A | 11/1989 |
| JP | 2009-041891 A | 2/2009 |
| JP | 2010-059952 A | 3/2010 |
| WO | 9721024 A1 | 6/1997 |
| WO | 9827321 A | 6/1998 |
| WO | 2001042631 A1 | 6/2001 |
| WO | 2002023099 A1 | 3/2002 |
| WO | 2005064127 A1 | 7/2005 |
| WO | WO2009110843 A1 | 9/2009 |

OTHER PUBLICATIONS

Search Report issued by the Intellectual Property Office of the United Kingdom regarding GB Application No. 1413979.4 dated Feb. 17, 2015, 4 pages.

English Translation of Office Action issued by the Japanese Patent Office dated May 27, 2019, regarding related Japanese patent application No. 2017-526751, 7 pages.

Office Action issued by the Japanese Patent Office dated May 27, 2019, regarding related Japanese patent application No. 2017-526751, 6 pages.

\* cited by examiner

SOUND SUPPRESSION APPARATUS

CROSS-REFERENCE TO RELATED APPLICATIONS

This application is a United States national phase application of co-pending International Application No. PCT/EP2015/066153, filed Jul. 15, 2015, which claims priority to United Kingdom Application No. GB1413979.4, filed Aug. 6, 2014, the entire disclosures of which are hereby incorporated herein by reference.

FIELD OF THE INVENTION

The present invention relates to a sound suppression apparatus, and particularly to a sound suppression apparatus suitable for installation inside a gas transport duct. The present invention also provides gas transport ducts having sound suppression apparatuses in accordance with the invention arranged therein, and may be especially suitable for installation in intake or exhaust ducts of power generation equipment or in the oil and gas industries.

BACKGROUND

Many industrial processes require the intake or exhaust of large quantities of gas. Such industrial processes include power generation, heating, ventilation, and air conditioning (HVAC), forced-air cooling and fume extraction, as well as in processes, especially combustion processes, of the oil and gas industries.

Transport of such gas is usually achieved by flowing the gas through ducting of appropriate dimension and construction from the source of the gas to a location at where it is required to be exhausted or used. In the case of intake of gas, for example atmospheric air, the gas is transported from an intake vent, possibly provided with suitable filtering means, to a location at which the gas is used or required, via a suitable intake duct. In the case where gas is to be exhausted, the gas is transported from the location at which it is produced, possibly via various treatment processes such as filtering and scrubbing, to an exhaust vent at which the gas is to be exhausted, via an exhaust duct.

Firstly, the processes which use or generate the gas, such as combustion processes, may generate large quantities of undesirable noise. Further, where the rate of transport of gas is to be high, the transport of gas can be associated with the generation of undesirable noise. Also, the means by which the gas is drawn into or drawn out of the location where the gas is produced or consumed, for example fans and the like, can generate substantial amounts of undesirable noise themselves. Transport of this noise via the gas in the duct to the surrounding environment is undesirable. Particularly, health, safety and environmental considerations, as well as applicable laws and regulations, often restrict the noise level to which plant operators, local workers, local residents or wildlife is exposed. Therefore, there is a need to provide reliable means of reducing the noise level associated with gas intake and gas exhaust processes.

It is known in the art to provide gas transport ducts with elements which are able to absorb a portion of the acoustic energy present in the gas flow through the duct, thereby to reduce the noise level associated with the gas transport process. Such elements are often referred to as sound suppression elements.

One example of a technique for sound suppression in a gas transport duct includes the positioning of resistive sound-absorbing elements in the duct. These elements are made of a material which presents resistance to the propagation of the sound wave, for example by being composed of a mass of fibres or having a large number of interconnected pores. Interaction of the sound wave with this material absorbs acoustic energy from the sound wave and converts it to another form of energy, typically heat. Portions, such as sheets, of such resistive sound-absorbing material may be applied to the inner walls of the duct, so as to absorb acoustic energy from gas passing through the duct. Often, the materials used as resistive sound-absorbing materials, such as rock wool or glass wool, are relatively fragile and can be eroded by the passage of high velocity gas, especially passing at elevated temperatures. Therefore, it is known to secure the resistive sound-absorbing material against the wall using a layer of perforated material, such as steel mesh, which is more resistant to erosion by the flow of gas. Such a configuration is disclosed in British patent application publication GB 2 122 256 A.

Resistive sound-absorbing material typically absorbs efficiently only frequencies at which the thickness of the absorbent material is greater than a quarter wavelength of the sound. For frequencies below this limit, the sound-absorption process is far less efficient. Further, the effectiveness of the sound-absorbing process increases with the proportion of the internal surface of the duct exposed to the gas flow which is provided with resistive sound-absorbing material, as well as the length of duct over which the gas flow can interact with the resistive sound-absorbing material. Therefore, in order to suppress across a broad frequency band efficiently, a large thickness of resistive sound-absorbing material must be placed such that a relatively large proportion of the wall area is provided with the resistive sound-absorbing material. This tends to decrease the internal cross-sectional area of the duct.

However, as the internal cross-sectional area of the duct is decreased, the gas flow velocity increases for a given gas flow rate. Increasing the internal cross-sectional area of the duct to counter this effect reduces the sound absorption performance. Therefore, in order successfully to use resistive sound-absorbing material to achieve adequate sound suppression across a broad range of frequencies without decreasing the cross-section of the duct available for gas flow, the outer dimensions of the duct must, both in terms of cross-section and in terms of length, be increased. However, such an approach results in larger, heavier and correspondingly more expensive gas handling equipment.

In some circumstances, it is known to install resistive baffles inside a gas flow duct. Such baffles are installed within the cross-sectional flow path of the duct, and can either run fully across a cross-sectional dimension of the duct, essentially splitting the duct into two flow passages on either side of the baffle, or can be provided with a relatively smaller length than the cross-section of the duct into which they are installed so as to be arranged in a central space of the duct. The former is known as a splitter baffle, the latter is known as a brick baffle, sometimes also known as a bar baffle. The general plan view of such a resistive baffle, whether a brick baffle or a splitter baffle, is shown in FIG. 25.

In FIG. 25, baffle 2500 provides a mass of resistive sound-absorbing material 2510 of sufficient thickness, length and cross-sectional area to achieve a desired broad-band reduction of unwanted acoustic frequencies. Since baffle 2500 is to be placed in the gas flow inside the duct, baffle 2500 is also provided with a cap portion 2520 arranged to face the oncoming gas flow, and being configured to have a convex surface facing the oncoming gas flow so as smoothly to divert the gas flow to either side of the baffle. Cap portion 2520, by diverting the gas flow to either side of baffle 2500, functions firstly to reduce the impact of the baffle on smooth gas flow through the duct and secondly to reduce the possibility that the resistive sound-absorbing material 2510 will be eroded by the oncoming gas. Cap portion 2520, in the case of a splitter baffle, may have a constant cross-section running the entire vertical height of the baffle, which is perpendicular to the plane of the page. In some configurations, cap portion 2520 may be substantially semi-circular, and may smoothly join with essentially parallel sides of the resistive sound-absorbing material 2510. In some configurations, the mass of resistive sound-absorbing material is shielded by a screening material such as a mesh or fabric, which may define part of the outer surface of the baffle. In such a configuration, the screening material may be considered to form part of the resistive sound-absorbing material.

In the configuration of a brick silencer, FIG. 25 may represent not only the plan view, but also the elevation view, and cap portion 2520 may be in the form of a hemispherical dome, and again may be formed to join smoothly with parallel circumferential sides of resistive sound-absorbing material 2510 in the case where the baffle 2500 has an overall circular cross-section viewed in the direction of gas travel. In other configurations, baffle 2500 may have a generally square or rectangular configuration in the direction of gas travel, and the shape of cap portion 2520 may be appropriately selected.

At the other end of baffle 2500 to cap portion 2520, a fairing portion 2530 is provided to reduce further the impact of baffle 2500 on the smooth flow of gas through the duct. The fairing portion is constructed with a slight taper relative to the parallel walls of the resistive sound-absorbing material 2510 for reducing the impact on the flow of gas past the baffle.

An alternative technique for sound suppression to the resistive sound-absorbing element is the so-called reactive, sometimes termed reflective, sound-attenuating element. Such reactive sound-attenuating elements involve passing the gas flow past a geometrical feature such as a depression, channel or cavity, the geometry of which causes the propagation of a sound wave at a characteristic frequency in opposite direction and/or in opposite phase to the sound waves propagating in the transported gas. This can be achieved in one approach by changing the acoustic impedance of the gas flow duct, for example by expanding the cross-sectional area, so as to generate a reflected wave at the characteristic frequency in counter-phase to the incoming acoustic energy. Alternatively, this can be thought of as altering the acoustic resistance coupled to the sound-wave radiating source.

Alternatively, the gas flow may be split into two gas flows, travelling along two paths having different lengths, which are re-combined so that the interference of the sound waves at the exit of each path results in cancellation of the acoustic energy. Here, the path-length difference defines the characteristic frequency of the reactive sound-attenuating element. Further alternatively, a resonant cavity may be coupled to the flow path, either directly or via a connecting channel, the dimensions and geometry of the resonant cavity, as well as the area and length of the tube communicating between the resonant cavity and the flow path, being selected so that the waves generated in the resonant cavity when excited by the incident sound waves cancel out a desired portion of the noise in the gas flow. Such a resonant cavity can be thought of also as a trap for the acoustic energy in the gas flow, wherein the resonant mode or modes of the cavity, being a characteristic frequency of the resonator, absorb desired portions of the acoustic energy spectrum. The characteristic frequency may be a fundamental frequency of the resonator, or may be a harmonic frequency of the resonator.

One well-known configuration of resonant sound-absorber is the Helmholtz resonator, which consists of a large chamber connected by a narrow tube to the gas flow path. The characteristic frequency is defined by the geometry of the chamber. Another form of resonator is the quarter-wavelength resonator, which consists of a closed pipe extending from the gas flow path and having a length of approximately one quarter the intended wavelength of the characteristic frequency to be suppressed. A variant of the quarter-wavelength resonator is the so-called half-wavelength resonator, consisting of a pipe which, rather than having straight sides, tapers to a point and has a length of half the wavelength of the characteristic frequency which is intended to be suppressed. Further, there is the eighth-wavelength resonator, consisting of a pipe similar to the quarter wavelength resonator, but which is divided into an open-ended portion and a closed-ended portion which communicate with each other, the depth of which from the channel is one-eighth of the wavelength of the characteristic frequency which is to be suppressed.

Examples of each of these reactive sound-absorber types are shown in FIG. 24. Configuration A shown in FIG. 24 is the so-called impedance mismatch or expansion resonator, where the diameter of the duct is expanded to produce a reflection wave. Sometimes, perforated material covers the expansion region to maintain stable gas flow past the expansion region. Configuration B shown in FIG. 24 is a Helmholtz resonator, wherein a resonant cavity is connected by a short tube to the gas flow duct. Configuration C shown in FIG. 24 is the quarter-wave resonator, in the form of a short, closed pipe. Configuration D shown in FIG. 24 is the half-wave resonator, in the form of a tapered, closed pipe. Configuration E shown in FIG. 24 is the eighth-wave resonator, in the form of a divided, closed pipe. Configuration F shown in FIG. 24 is a side-channel resonator, sometimes termed the Herschel-Quincke tube, having the form of a short side-channel having a desired path length difference compared with the gas flow in the duct.

Although reactive sound-attenuating elements can be effective at suppressing a well-defined frequency and its harmonics, reactive sound-attenuating elements lack the broad-band sound-absorbing properties of the resistive absorber. Furthermore, providing such sound-attenuating elements in the walls of a duct again entails increasing the duct dimensions for a given desired gas flow rate and requires costly engineering of the walls of the duct to provide the desired resonant sound-absorbers at appropriate locations in the duct. Finally, providing such sound-attenuating elements in the walls of a duct is ineffective in suppressing higher frequencies which propagate in the duct at higher-order modes of the duct, since the acoustic energy associated with such frequencies propagates along the duct in mode patterns which are distant from, and thus interact less, with the walls of the duct.

It has therefore been proposed, in International patent application publication pamphlet WO 98/27321 A, to provide a modular duct in which i) ducting sections having reactive sound-attenuating elements integrated into the walls and ii) ducting sections having resistive sound-absorbing elements integrated into the walls are sequentially arranged. While such an approach can achieve broadband sound suppression with the resistive absorber and sound-absorption at specific frequencies with the resonant absorbing sections, such a configuration requires an increase in the external cross-sectional area of the duct for a given internal cross-sectional area, and thus inevitably results in a requirement for large, heavy and expensive ducting.

Furthermore, since the frequency spectrum associated with a gas transport duct results from a combination of the rate at which gas is transported along the duct, the gas-producing or gas-consuming equipment which is connected to the duct, the presence of intermediate gas treatment units such as filters, and the length and geometry of the duct itself, the provision of reactive and resistive sound-absorbers as part of the duct requires complex and expensive custom engineering work in designing the duct to meet the specific requirements of the project.

Despite the above-proposed techniques for control over unwanted noise in gas transport ducts, there is a need for sound suppression apparatus which is able to suppress a broad range of unwanted frequencies, for example high levels of targeted low-frequency control as well as good broadband performance, at high efficiency and which is cost-effective to manufacture and install.

SUMMARY OF THE INVENTION

According to a first aspect of the present invention, there is provided a sound suppression apparatus for installation inside a gas transport duct, the sound suppression apparatus comprising: a resistive sound-absorbing element; and a housing providing a reactive sound-attenuating element communicating with a surrounding of the apparatus via opening in an outer surface of the housing; wherein an outer surface of the sound suppression apparatus comprises an outer surface of the resistive sound-absorbing element and the outer surface of the housing.

By providing such a hybrid sound suppression apparatus, both resistive and reactive sound-attenuating elements are able to interact with a gas stream passing the outer surface of the apparatus and a sound suppression performance which exceeds the individual contributions expected from resistive or reactive elements alone can thereby be obtained. Further, by providing such an apparatus, the resistive and reactive elements interact with the gas stream via a common external surface of the apparatus, the aerodynamic properties of the apparatus as a whole can be selected so as to provide enhanced sound suppression performance while minimising unwanted disruption to a passing gas stream.

In some embodiments of the first aspect, the housing extends from the resistive sound-absorbing element.

In some embodiments of the first aspect, the sound suppression apparatus has an elongate form in a longitudinal direction from a first end of the sound suppression apparatus to a second end of the sound suppression apparatus, the resistive sound-absorbing element is arranged relatively closer to the first end than the housing, and the housing has a profile in a plane including the longitudinal direction which tapers in the longitudinal direction.

In some embodiments of the first aspect, the outer surface of the sound suppression apparatus has reflection symmetry about a first plane including the longitudinal direction, the resistive sound-absorbing element provides a resistive sound-absorbing surface on both sides of the first plane, and the housing provides a reactive sound-attenuating element communicating with an outer surface of the housing on at least one side, optionally both sides, of the first plane.

In some embodiments of the first aspect, the outer surface of the sound suppression apparatus has symmetry about a second plane including the longitudinal direction and being perpendicular to the first plane, the resistive sound-absorbing element provides a resistive sound-absorbing surface on both sides of the second plane, and the housing provides a reactive sound-attenuating element communicating with an outer surface of the housing on at least one side, optionally both sides, both sides of the second plane.

In some embodiments of the first aspect, the resistive sound absorbing element consists of a mass of sound-absorbing material. In some embodiments, the mass of sound-absorbing material is shielded by a screening material such as a mesh or fabric.

In some embodiments of the first aspect, the resistive sound absorbing element comprises at least one layer of sound-absorbing material supported by a supporting member, the supporting member optionally being provided by part of the housing.

In some embodiments of the first aspect, the reactive sound-attenuating element comprises a cavity of the housing.

In some embodiments of the first aspect, the opening of the housing is provided with a perforate portion arranged to cover or lie within the opening.

In some embodiments of the first aspect, the outer surface of the housing comprises the perforate portion.

In some embodiments of the first aspect, the cavity of the housing is provided with a partition member for setting a characteristic frequency of the reactive sound-attenuating element to a predetermined value. Where the sound suppression apparatus is in the form of a splitter, being elongate in a vertical direction across the duct and relatively narrow in a perpendicular horizontal direction across the duct, such a partition member may be provided in the horizontal plane.

In some embodiments of the first aspect, the partition member is arranged to divide the cavity into a closed-ended portion and an open-ended portion which communicate with each other, the open-ended portion communicating with the opening of the housing.

In some embodiments of the first aspect, the partition member is an L-shaped plate.

In some embodiments of the first aspect, the reactive sound-attenuating element comprises a plurality of cavities of the housing, each communicating with a respective opening of the housing.

In some embodiments of the first aspect, the reactive sound-attenuating element comprises a cavity of the housing which communicates with a plurality of openings of the housing.

In some embodiments of the first aspect, a cap portion is provided arranged at a first end of the sound suppression apparatus to provide a convex end surface to the sound suppression apparatus, the cap portion optionally being part of the housing.

In some embodiments of the first aspect, the cap portion provides a curved end surface to the sound suppression apparatus.

In some embodiments of the first aspect, the outer surface of the sound suppression apparatus is shaped to provide aerodynamic gas flow from a first end to a second end of the sound suppression apparatus.

In some embodiments of the first aspect, the resistive sound-absorbing element comprises at least one of a porous, fibrous, foamed or granular sound-absorbing material.

In some embodiments of the first aspect, the reactive sound-attenuating element is a resonant cavity.

According to a second aspect of the present invention, there is provided a gas transport duct, comprising: an enclosed channel defining a passage for transporting gas; and at least one sound suppression apparatus according to the first aspect of the present invention arranged in the passage such that transported gas flowing in the enclosed channel will interact with the resistive sound absorbing element and the reactive sound-attenuating element.

In some embodiments of the second aspect, the at least one sound suppression apparatus is arranged in the passage so as to divide the passage into at least two sub-passages.

In some embodiments of the second aspect, the at least one sound suppression apparatus comprises a plurality of sound suppression apparatuses and at least two of the sound suppression apparatuses are provided with respective reactive sound-attenuating elements having different characteristic frequencies.

In some embodiments of the second aspect, the different characteristic frequencies are related by one-third of an octave.

In some embodiments of the second aspect, the at least one sound suppression apparatus is arranged in the passage such that a plurality of reactive sound-attenuating elements are provided at positions across the passage which correspond to a higher-order propagating mode pattern of the passage and to a fundamental or harmonic characteristic frequency of the reactive sound-attenuating elements.

Embodiments of the present invention may provide a sound suppression apparatus which is able to suppress a broad range of unwanted frequencies, for example high levels of targeted low-frequency control as well as good broadband performance, at high efficiency and which is cost-effective to manufacture and install.

BRIEF DESCRIPTION OF THE DRAWINGS

For a better understanding of the present invention, and to show how the same may be carried into effect, reference will be made, by way of example only, to the accompanying Drawings, in which.

DETAILED DESCRIPTION

Figure 1:
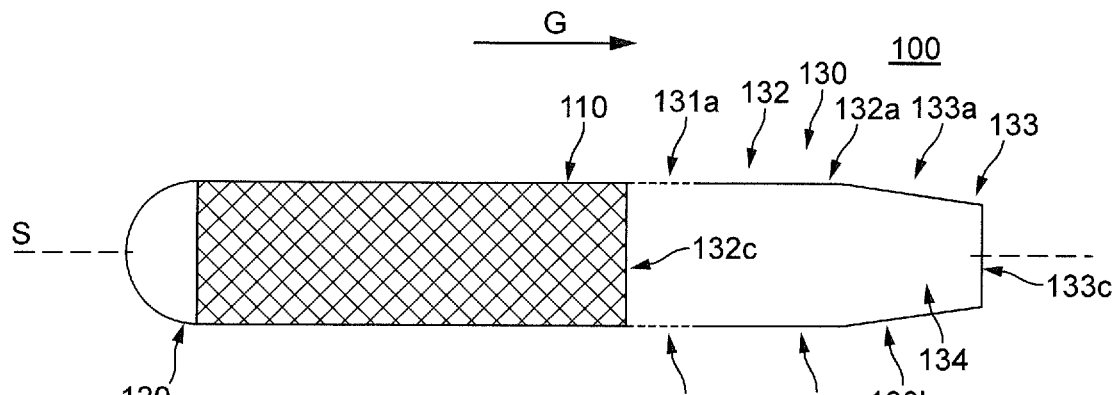
FIG. 1 shows a plan view of a sound suppression apparatus in accordance with a first embodiment of the present invention.

According to a first embodiment of the present invention, there is provided a sound suppression apparatus as shown in FIG. 1.

Figure 25:
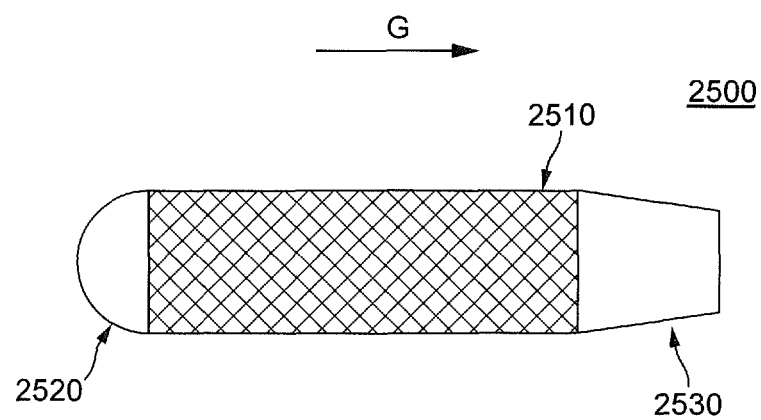
FIG. 25 shows a cross-section through a known baffle configuration.

FIG. 1 shows a sound suppression apparatus 100 having a configuration similar to the baffle 2500 of FIG. 25. Where the configuration is the same or similar, no further detail will be given, and the reader is referred to the corresponding elements of the baffle 2500 of FIG. 25.

The sound suppression apparatus 100 has a mass of resistive sound-absorbing material 110 arranged between a cap portion 120 in an upstream direction of gas flow G and a housing 130 arranged in a downstream direction of gas flow G, in a similar manner as baffle 2500 shown in FIG. 25.

As for baffle 2500 in FIG. 25, in the cross-section shown in FIG. 1, the resistive sound-absorbing material has straight, generally parallel sides, to permit the gas to flow smoothly and aerodynamically past. Aerodynamic flow, as herein discussed, refers to substantially laminar flow in a direction of elongation of the sound suppression apparatus. Cap portion 120 is convex towards a direction of incident gas flow to allow the incident gas to flow smoothly and aerodynamically around sound suppression apparatus 100. The resistive sound-absorbing material 110 may be, for example, a porous, fibrous, foamed or granular sound absorbing material. Suitable materials can include rock wool, glass wool, basalt wool or an artificial or natural porous ceramic such as a pumice. In other configurations, cap portion 120 may be square, square with rounded corners, triangular, conical or pyramidal.

However, in contrast to the configuration of FIG. 25, where the baffle 2500 of FIG. 25 has fairing portion 2530, sound suppression apparatus 100 has housing 130 arranged downstream of the resistive sound-absorbing material 110 in a gas-flow direction. Although housing 130 has a similar function to fairing 2530, in that housing 130 includes a tapered portion 133 to permit the gas flow to flow smoothly and aerodynamically downstream of the sound suppression apparatus 100, housing 130 also has a straight portion 132 connecting a downstream end of resistive sound-absorbing material 110 with taper portion 133. Housing 130, in alternative configurations, can have a generally square, square with rounded corners, triangular, conical or pyramidal configuration in cross-section when viewed from the direction of incident gas flow.

In straight portion 132, perforate portions 131a and 131b are arranged on opposite sides of the sound suppression apparatus, which perforate portions define openings communicating between the exterior of the sound suppression apparatus and an internal space of housing 130. Here, an opening is defined as a region of a surface through which gas can pass, either through a single continuous aperture or through a plurality of perforations. The perforations may, for example, provide an open area percentage in a perforate region of at least 20%, at least 30%, at most 80%, at most 70%, at most 60%, at most 50%, or at most 40%, optionally being in the range 10% to 80%, further optionally being in the range 20% to 60%, yet further optionally being in the range of 22% to 40% for an appropriate balance between acoustic transparency and effective guidance of flow. The perforations may be identical, for example polygonal or circular, or may have varying shapes and dimensions. Perforate portions 131a and 131b extend substantially the entire height of housing 130, although in certain configurations the perforate portions may only extend a proportion of the entire height of housing 130, for example at least 30%, 40%, 50%, 60%, 70%, 80% or 90% the height of housing 130. Alternatively, the perforated portions may be restricted to at most 30%, 40%, 50%, 60%, 70%, 80% or 90% the height of housing 130. The perforate portions on each side of housing 130 can be continuous, or can be provided as discrete and separated perforate regions in the vertical direction.

In the cross-section shown in FIG. 1, housing 130 is bounded by an upstream end surface 132c, straight side walls 132a and 132b, taper side walls 133a and 133b, and trailing end surface 133c. Parallel and opposed straight side walls 132a and 132b define straight portion 132, while taper side walls 133a and 133b, each having a taper angle of 7.5°, define taper portion 133, together with trailing end surface 133c.

While trailing end surface 133c is shown as being flat, this surface may be provided, for example, as an outwardly-convex surface or may be entirely absent in the case where taper side walls 133a and 133b converge to a trailing point. The precise configuration of taper portion 133 may be selected partly based on aerodynamic considerations to suit the expected gas flows in the duct into which sound suppression apparatus 100 is to be inserted.

In the present configuration, sound suppression apparatus 100 has a generally symmetric form in the cross-sectional plane of the paper with reference to a plane of symmetry S, which extends perpendicular to the plane of the paper and contains the direction of gas flow G. By providing a generally symmetric profile, asymmetric aerodynamic forces and diversion of the gas flow are avoided, and therefore the impact on the gas flow is reduced. However, in some applications, asymmetric forms may be adopted in order, for example, to assist in a diversion of the gas flow in a particular direction, by means of an aerofoil-type profile.

In a first configuration, the embodiment of FIG. 1 is provided for use as a splitter, having an extent in the direction perpendicular to the plane of the page so as to match an internal cross-section of the duct into which the sound suppression apparatus 100 is intended to be installed. In such a configuration, the internal walls of the duct against which the sound suppression apparatus 100 is placed may define surfaces which enclose void 134, otherwise defined by walls 132a, 133a, 133c, 133b, 132b and 132c. Alternatively, end (top and bottom) walls may be provided having a shape similar to the plan shape of housing 130, respectively above and below the plane of the paper, to enclose void 134 otherwise enclosed by walls 132a, 133a, 133c, 133b, 132b and 132c of housing 130. Such end walls may be mutually parallel and parallel to the plane of the page.

In a case where sound suppression apparatus 100 extends perpendicular to the plane of the page so as to span an entire cross-sectional area of the duct into which it is installed, cap portion 120 and resistive sound-absorbing material 110 may also extend across the total internal cross-sectional span of the duct in the same way as housing 130. However, in some configurations, the resistive sound-absorbing material 110 may only be provided to a proportion of the height of the sound suppression apparatus 100 spanning the duct, and plate regions may be provided in the cross-sectional direction of the duct on either side of the resistive sound-absorbing material to extend as far as the walls of the duct, as desired.

Figure 2:
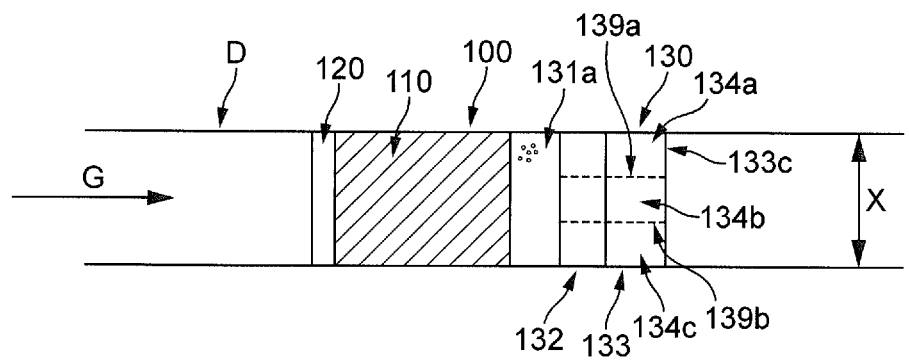
FIG. 2 shows a sound suppression apparatus as shown and described with reference to FIG. 1 installed as a splitter baffle in a gas transport duct.

FIG. 2 shows an example of such one such configuration of the embodiment of FIG. 1, shown in elevation and installed across an entire cross-sectional span X of a duct D, functioning as a splitter. Gas flow G, incident from the left-hand side of FIG. 2, impinges on cap portion 120 and is split in directions above and below the page to pass either side of sound suppression apparatus 100.

In an alternative configuration, sound suppression apparatus 100 need not extend the full cross-sectional dimension X of the duct, and in such a case, housing 130 should be closed by appropriate top and bottom plates, such that the void 134 is enclosed on all sides.

In contrast to the baffle 2500 shown in FIG. 25, by providing housing 130 having internal void 134 communicating with an outer surface of housing 130 via perforate portions 131a and 131b, and thereby communicating with the gas flow G passing sound suppression apparatus 100, a reactive sound-attenuating element is provided which acts to reduce the intensity of selected acoustic frequencies in the gas flow passing the sound suppression apparatus. In the configuration shown in FIG. 1, void 134 is essentially a closed space, being connected to the flowing gas by perforate portions 131a and 131b, and being bounded by upstream end surface 132c, straight side walls 132a and 132b, taper side walls 133a and 133b, and trailing end wall 133c. Void 134 acts as a resonator chamber, the characteristic frequency of which corresponds to the acoustic frequency to be reduced in the flowing gas.

In the present configuration, the size and shape of the perforated area on each side of the housing substantially corresponds to the cross-sectional area of void 134 across a direction of sound propagation into the void. In the present configuration, this is the cross-sectional area of void 134 taken across the direction of incident gas flow. Such a configuration can enhance coupling of the acoustic energy in the gas stream into the resonator defined by the void.

It is possible to alter the characteristic frequency at which void 134 acts by adjusting the geometry of housing 130. For example, making the housing longer in a dimension from the upstream end surface 132c to trailing end wall 133c will tend to lower the resonant frequency. Adjusting the relative length of taper portion 133 and straight portion 132 as well as the taper angle of the taper portion will also adjust the tuning, and also the bandwidth of the resonant peak. Such adjustments are considered to be well within the scope of the person skilled in the art to achieve, based on straightforward experimentation and acoustic design. Particularly, a taper angle of 7.5° toward a trailing wall provides a resonant structure having a characteristic frequency between that of a quarter-wave and a half-wave resonator while retaining good aerodynamic performance. In the case of configurations which converge to a trailing point, the cavity may correspond to a half-wave resonator.

It is also possible to improve the effectiveness of the resonant void 134 by dividing it, as shown in FIG. 2, into sub-spaces shown as voids 134a, 134b and 134c in FIG. 2, by divider plates 139a and 139b placed horizontally, that is, in the plane of the plan view of FIG. 1, in void 134. Such a configuration essentially provides, instead of a void with resonant volume V, three resonant volumes of similar geometries in plan view, but having respective individual volumes of approximately V/3. The arrangement of such volumes one above each other allows one resonant cavity to be provided for each corresponding node in the vertically-oriented mode pattern inside the duct, in order to control frequencies above the plane-wave region.

In the configuration of FIG. 1, two perforate portions are provided arranged on either side, in the plan view of FIG. 1, of housing 130, in respective opposed straight side walls 132a and 132b. However, in the splitter configuration of FIG. 1, it is also possible to arrange such perforate portions only on one side or the other side, with the corresponding portion being absent and replaced by a contiguous wall. When a brick configuration is provided, such perforate portions may be provided on all peripheral surfaces in the cross-section viewed along a direction of incident gas flow, or only on some of the peripheral surfaces. Alternatively, rather than perforate portions, openings without any perforate covering may be provided.

Providing perforate portions rather than openings has been observed to introduce damping into the resonant system so as to broaden the resonant peak, allowing for easier tuning of the cavity and absorption of the acoustic energy over a greater frequency range either side of the characteristic frequency. Further, the presence of such damping reduces the likelihood of undesired resonator whistling. Finally, using perforate portions allows a good aerodynamic profile to be maintained, even when the proportion of the surface area of the housing provided with the perforate portions is large. Perforate portions may be provided by providing perforations in the material from which straight side walls 132A and 132B are made, or by providing a perforated mesh to cover or lie within corresponding apertures formed in straight side walls 132a and 132b.

In the configuration of FIG. 1, housing 130 is provided downstream of resistive sound-absorbing material 110, but an alternative configuration is also possible. Specifically, it is possible to provide a fairing without any reactive sound-attenuating element downstream of resistive sound-absorbing material 110 and to place a housing providing a reactive sound-attenuating element communicating with an outer surface of the housing, corresponding to the space enclosed by straight portion 132 in FIG. 1, upstream of resistive sound-absorbing material 110 between cap portion 120 and resistive sound-absorbing material 110. Further, it is possible to place two such housings on either side of resistive sound absorbing material 110 in the direction of gas flow, so that a reactive sound-attenuating element, namely a resonant chamber, is provided both upstream and downstream of the resistive sound-absorbing material.

Preferably, for aerodynamic reasons, the entire outer surface in cross-section shown in FIG. 1 is continuous, without step changes or sharp angles. This assists with achieving smooth and aerodynamic flow of gas over the sound suppression apparatus 100. However, an appropriately-sized gap, for example less than 5 mm, preferably less than 3 mm, can exist between housing 130 and sound-absorbing material 110 and/or between sound-absorbing material 110 and cap portion 120 without substantially affecting the aerodynamic properties.

While the embodiment of FIG. 1 has been explained with reference to a resonant sound-absorber, another reactive sound-absorber as shown in FIG. 25, such as an expansion chamber or a side-channel, can be provided in the housing communicating with an outer surface of the housing. However, the use of a resonant chamber as shown in FIG. 1 has particular advantages of space efficiency and relatively easy and predictable characteristic frequency control.

By providing a sound suppression apparatus 100 as shown in with FIG. 1, the broad-band acoustic energy absorbing effect of the resistive sound-absorbing material is combined with the characteristic-frequency attenuating property of the reactive sound-attenuating element provided as the resonant chamber formed by void 134 to provide good overall noise suppression performance. The apparatus 100 also only has a similar impact on the flow in the duct as the conventional baffle of FIG. 25, does not require modification of the duct itself, can be provided in a standard shape and size to fit a variety of ducts, and can be easily installed into conventional ducting for a new project or can be retro-fitted to an existing ducting to provide additional damping, without requiring an increase in the size, weight or engineering complexity of the duct itself. Therefore, the sound suppression apparatus 100 as shown in FIG. 1 can provide a number of technical advantages, effects and solutions to technical problems as will occur to the skilled reader considering this disclosure.

In alternative configuration, in the same way as baffle 2500 of FIG. 25, the sound suppression apparatus 100 can be provided in configurations as a splitter-type baffle, and also in configurations as a brick-type baffle, for example with a rectangular, square, polygonal or circular cross-sectional profile, to be suspended or otherwise arranged within a duct. If a brick-type sound suppression apparatus is provided, rather than a splitter-type silencer, the resistive sound-absorbing material can be disposed only on one side of the sound-absorbing apparatus as viewed from the direction of oncoming gas, on both sides of the sound-absorbing apparatus, on top and bottom sides of the sound-absorbing apparatus, or on an entire periphery of the sound-absorbing apparatus. In such cases, the perforate portions or apertures communicating with void 134 may be provided to match the presentation of the resistive sound-absorbing material on the outer surface of the silencer, or may be provided at alternate or different regions of the cross-sectional profile viewed from the direction of gas flow, as may be required.

Figure 3:
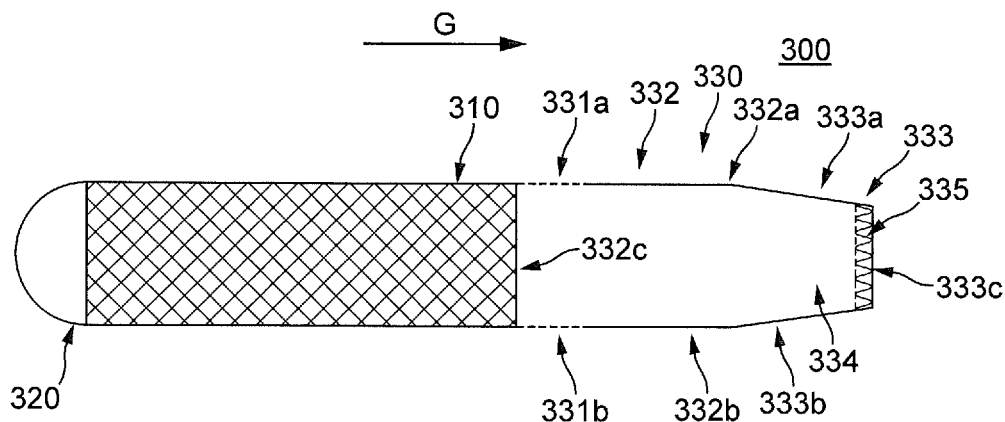
FIG. 3 shows a sound suppression apparatus in accordance with a second embodiment of the present invention.

FIG. 3 shows a second embodiment of the present invention, in which the same or similar parts will be represented by elements labelled 3XX where elements of the first embodiment were labelled 1XX. The embodiment of FIG. 3 is very similar to the embodiment of FIG. 1, except that the embodiment of FIG. 3 also includes a resistive sound-absorbing material 335 positioned in void 334 of housing 330. The resistive sound-absorbing material can be the same or different to that used in the resistive sound-absorbing element 310. Although the porous-absorbing material 335 in FIG. 3 is shown positioned on the inner surface of trailing end wall 333c in the form of a sheet, other arrangements are possible. For example, the porous-absorbing material 335 may be arranged along one or more of walls 332a, 333a, 333b, 332b or 332c. In some cases, void 334 may be wholly or partly filled with loosely-packed absorbing material, such as low density rock wool. Like the perforated portion 331a and 331b, the effect of the resistive sound-absorbing material 335 is to broaden the resonant peak, thereby broadening the range of frequencies either side of the characteristic frequency at which the reactive sound-attenuating element defined by housing 320 is effective.

Figure 4:
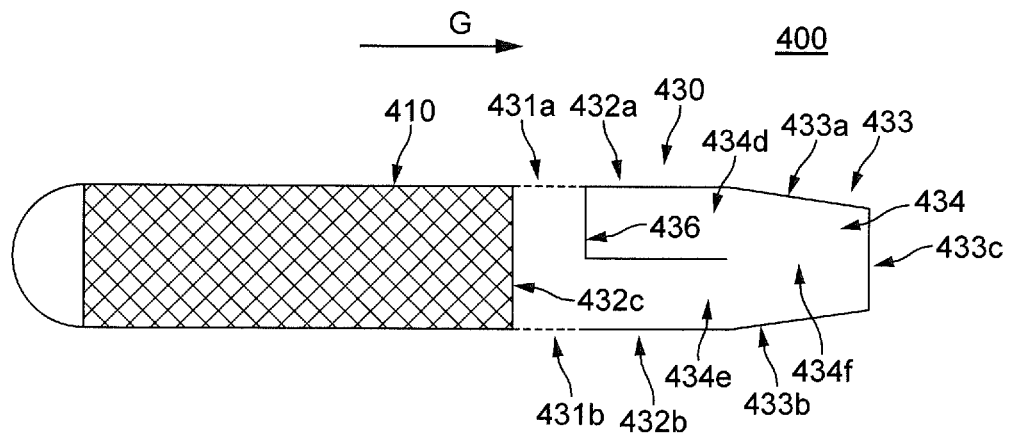
FIG. 4 shows a sound suppression apparatus in accordance with a third embodiment of the present invention.

FIG. 4 shows a third embodiment of the present invention, in which the same or similar parts will be represented by elements labelled 4XX where elements of the first embodiment were labelled 1XX. The arrangement of FIG. 4 is very similar to the arrangement of FIG. 1.

In the arrangement of FIG. 4, inside housing 430 is positioned a partition member 436, in the form of an L-plate extending from, for example, wall 432a of housing 430 at a position rearward of perforate opening 431a. Partition member 432a extends the full height of housing 430 in directions perpendicular to the plane of the paper, so as to divide void 434 into portions 434d and 434e, which communicate through aperture 434f defined between partition member 432a and trailing end wall 433c. Void 434e communicates with perforate openings 431a and 431b, while partition member 432a closes one end of void 434d. Therefore, because of the presence of partition member 432a, the effective resonant length of void 434 is approximately doubled and the resonant frequency is correspondingly decreased. The configuration of FIG. 4 can therefore be used where it is undesirable or impractical to extend housing 430 rearward, but there is need for a resonator which operates at relatively low frequencies.

The shape of partition member 432a can be modified, and partition member 432a can be provided, for example, as a single plate extending from, e.g., wall 332a at an angle rearward towards trailing end wall 433c, or as a curved plate provided extending inwardly from wall 432a and curving towards tail-end wall 433c.

Figure 5:
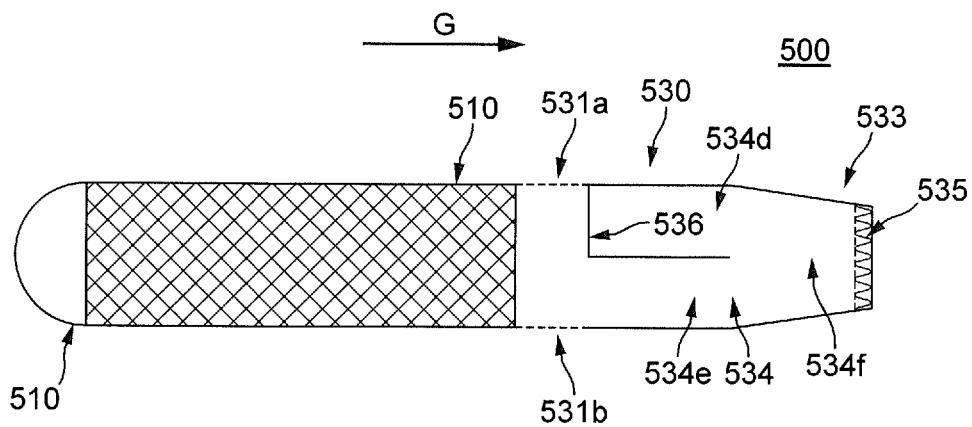
FIG. 5 shows a sound suppression apparatus in accordance with a fourth embodiment of the present invention.

FIG. 5 shows a fourth embodiment of the present invention, which combines the features of the second and third embodiments, having a partition member and also a porous-absorbing material positioned in the cavity. In FIG. 5, the same or similar parts are represented by elements labelled 5XX where elements of the second embodiment were labelled 3XX and elements of the third embodiment were labelled 4XX.

Figure 6:
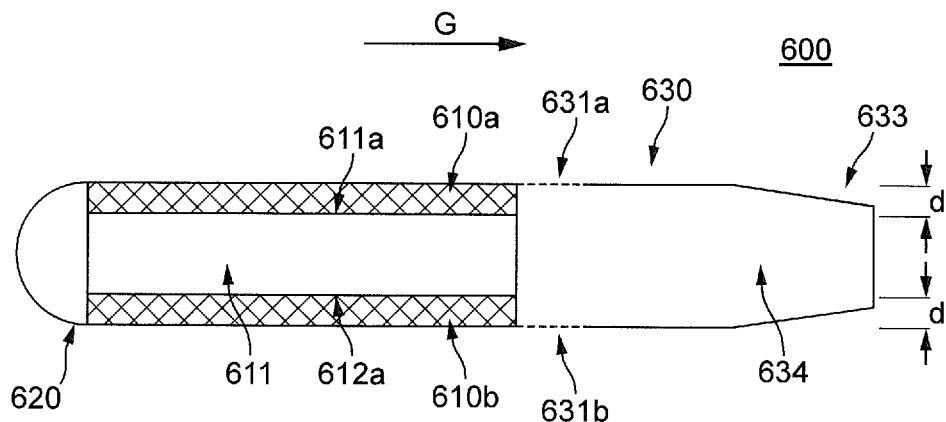
FIG. 6 shows a sound suppression apparatus in accordance with a fifth embodiment of the present invention.

FIG. 6 shows a fifth embodiment of the present invention, in which the same or similar parts are represented by elements labelled 6XX where elements of the first embodiment were labelled 1XX. Sound suppression apparatus 600 shown in FIG. 6 is similar to the first embodiment shown in FIG. 1. However, the resistive sound-absorbing material is not provided as a single uniform mass, but rather is provided in the form of two plates 610a, 610b provided on either side of the sound suppression apparatus 600 relative to a direction of gas flow and supported by a supporting member 611.

Plates 610a have sufficient thickness d to absorb a desirable range of frequencies, and are supported by supporting member 611. Supporting member 611 may be a hollow member providing opposite surfaces 611a and 612a against which the resistive sound-absorbing material is provided. Alternatively, supporting member 611 may itself be formed of a strong yet lightweight mesh material, cellular material or scaffolding which will support the resistive sound-absorbing material 610a and 610b without adding significant weight to the structure. Such a configuration may be preferred when the sound suppression apparatus is required to have large overall dimensions relative to the thickness of resistive sound-absorbing material which is to be provided in the resistive sound-absorbing element.

Figure 7:
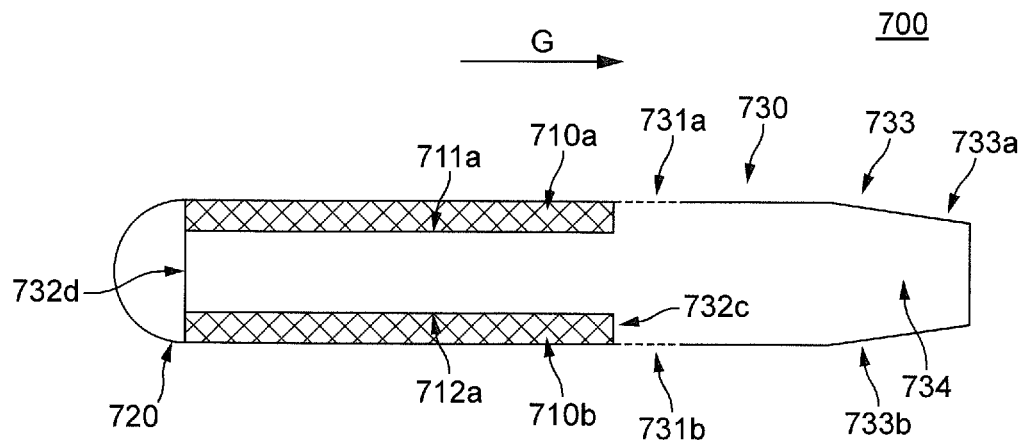
FIG. 7 shows a sound suppression apparatus in accordance with a sixth embodiment of the present invention.

FIG. 7 shows a sixth embodiment of the present invention based on the fifth embodiment of FIG. 6. In the embodiment of FIG. 7, in which the same or similar parts are represented by elements labelled 7XX where elements of the fifth embodiment were labelled 6XX, sound suppression apparatus 700 is provided with a reactive sound-attenuating element, the housing of which extends into the space occupied by supporting member 611 in FIG. 6. Side walls 711a and 712a, against which resistive sound-absorbing material 710a and 710b is arranged, extend toward the end cap 720 from wall 732c of housing 730 toward wall 732d of housing 730, which defines the upstream end of the housing, the space to the upstream side of wall 732d being enclosed by end cap 720. Void 734 therefore extends towards cap 720 as far as end wall 732d. Perforated portions 731a and 731b, which allow void 734 to communicate with the surface of the sound suppression apparatus, are provided at the same position as they are in FIG. 1. However, in this configuration they may also be moved rearwardly along the direction of gas flow G so as to be positioned, for example, on walls 733a and 733b of the tapered portion 733 of housing 730.

In a related configuration, a further partition can be provided to the housing 730 between walls 732d and 732c as desired to adjust the characteristic frequency associated with void 734.

The configuration of FIG. 7 allows a very large resonant cavity to be achieved for allowing very low frequencies to interact with the resonant cavity of the sound suppression apparatus whilst maintaining the overall length of the apparatus.

Figure 8:
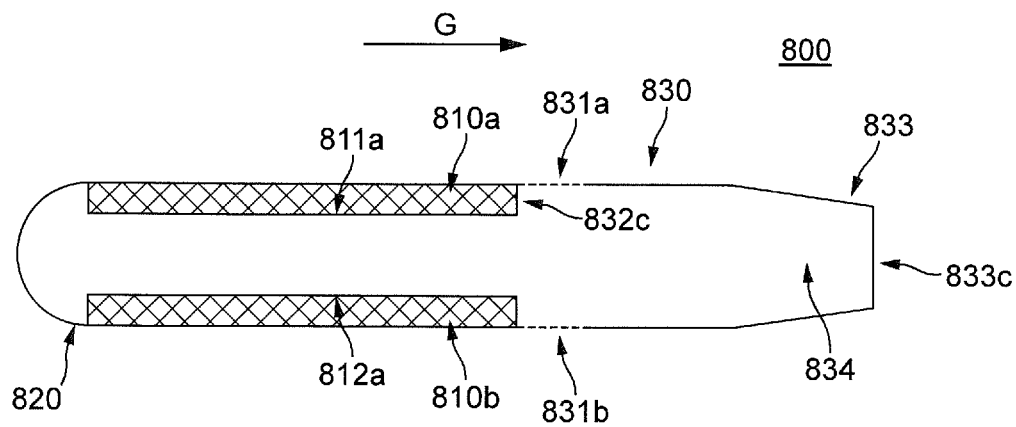
FIG. 8 shows a sound suppression apparatus in accordance with a seventh embodiment of the present invention.

FIG. 8 shows a seventh embodiment of the sound suppression apparatus, being a modified form of the sixth embodiment of FIG. 7, in which the same or similar parts are represented by elements labelled 8XX where elements of the sixth embodiment were labelled 7XX. The seventh embodiment of FIG. 8 differs from the sixth embodiment shown in FIG. 7 in which wall 732d separating void 734 from the space enclosed by leading end cap 720 is removed, and the entire length of sound suppression apparatus 800 is available for use as a resonant cavity.

Figure 9:
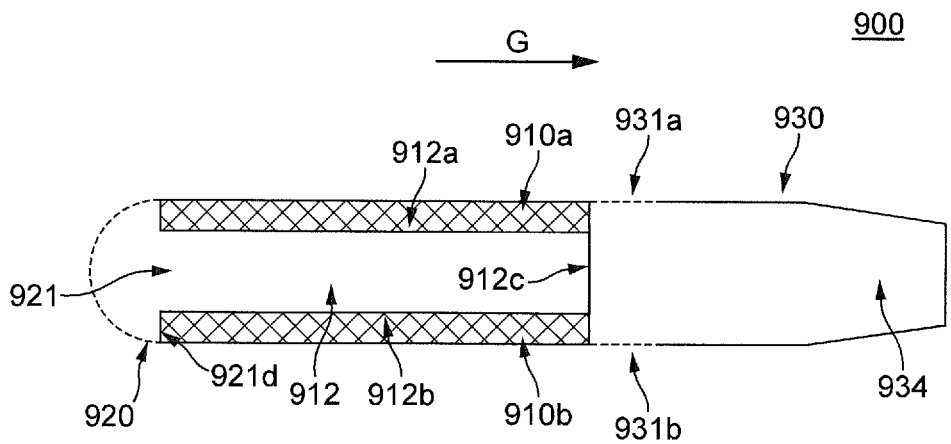
FIG. 9 shows a sound suppression apparatus in accordance with an eighth embodiment of the present invention.

FIG. 9 shows an eighth embodiment of the present invention, being a modified form of the fifth embodiment of FIG. 6, in which the same or similar parts are represented by elements labelled 9XX where elements of the fifth embodiment were labelled 6XX. The eighth embodiment of FIG. 9 differs from the fifth embodiment of FIG. 6 in that that the wall separating the end cap from the space enclosed by supporting member 611 in FIG. 6 is removed and end cap 920 in FIG. 9 is perforated so as to allow the void 921 defined inside supporting member 912 to be used as the resonant chamber of a further reactive sound-attenuating element. The resonant chamber of this further reactive sound-attenuating element is then defined by walls 912a, 912b, 912c and end cap 920, and the dimensions of the void can be chosen to select the characteristic frequency.

The configuration of FIG. 9 thus provides two reactive sound-attenuating elements, and taking into account also housing 930 defining enclosed space 934 communicating with the outer surface of the sound suppression apparatus 900 via perforate openings 931a and 931b.

Of course, in the configuration of FIG. 9, only a side portion or a tip portion of end cap 920 may be perforate, rather than the entire surface as depicted in FIG. 9.

In a related configuration, the position of wall 912c can be adjusted to adjust the characteristic frequency associated with the end-cap resonator. Additionally or alternatively, a further partition can be provided to the housing 930 downstream of wall 912c as desired to adjust the characteristic frequency associated with void 934.

Figure 10:
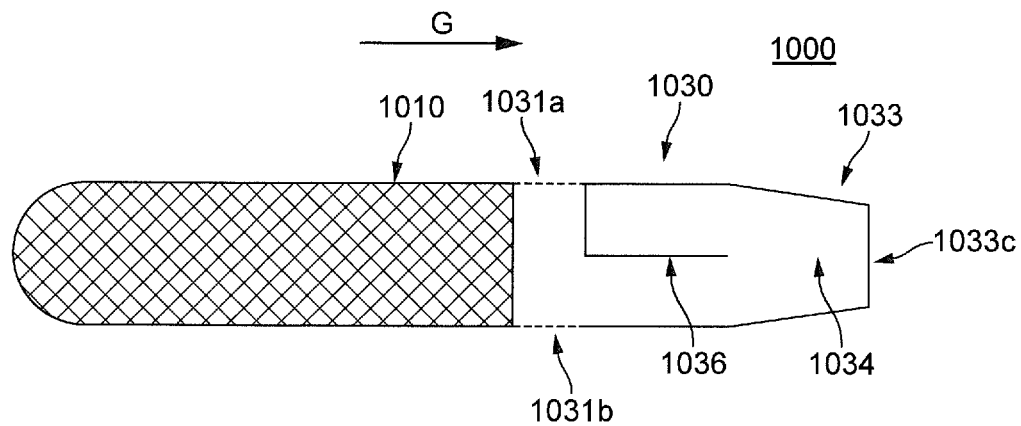
FIG. 10 shows a sound suppression apparatus in accordance with a ninth embodiment of the present invention.

FIG. 10 shows a ninth embodiment, in which the same or similar parts are represented by elements labelled 10XX where elements of the first embodiment were labelled 1XX. In the ninth embodiment of FIG. 10, no end cap is provided, but instead porous material 1010 extends to the front end of sound suppression apparatus 100 so as to meet the incident gas flow G. In this configuration, a larger surface area is available for interaction with the incident gas flow. However, the configuration of FIG. 10 may be less appropriate when the resistive sound-absorbing material 1010 is particularly susceptible to erosion by the incident gas stream. In such situations, when using the configuration of FIG. 10, it may be necessary to replace porous material 1010 more frequently than if a cap portion were provided.

Figure 11:
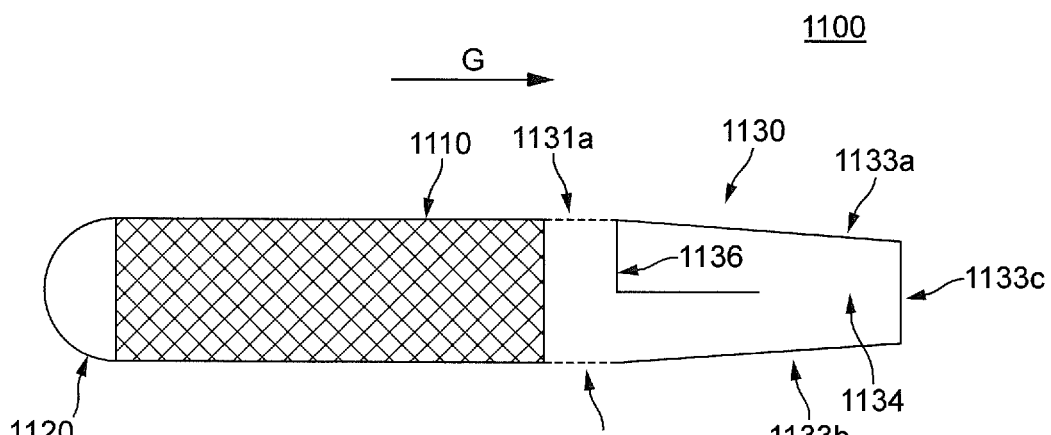
FIG. 11 shows a sound suppression apparatus in accordance with a tenth embodiment of the present invention.

A tenth embodiment of the present invention is shown in FIG. 11 based on the third embodiment of FIG. 4. The embodiment of FIG. 11, in which the same or similar parts are represented by elements labelled 11XX where elements of the third embodiment are labelled 4XX, includes a partition member 1136 dividing void 1134 which is enclosed by housing 1130 into two sections. However, the embodiment of FIG. 11 differs from the arrangement of FIG. 4 in that no straight portion bounded by straight walls 432a and 432b is present. Rather, tapered walls 1133a and 1133b extend rearwardly from perforate openings 1131a and 1131b. The configuration of FIG. 11 may be particularly preferred when the sound suppression apparatus is relatively short and there is a need to optimise the gas flow past the silencer for minimum disruption. In a further variant, perforate openings 1131a and 1131b may be provided in the tapered walls, such that the entire housing portion is tapered.

Figure 12:
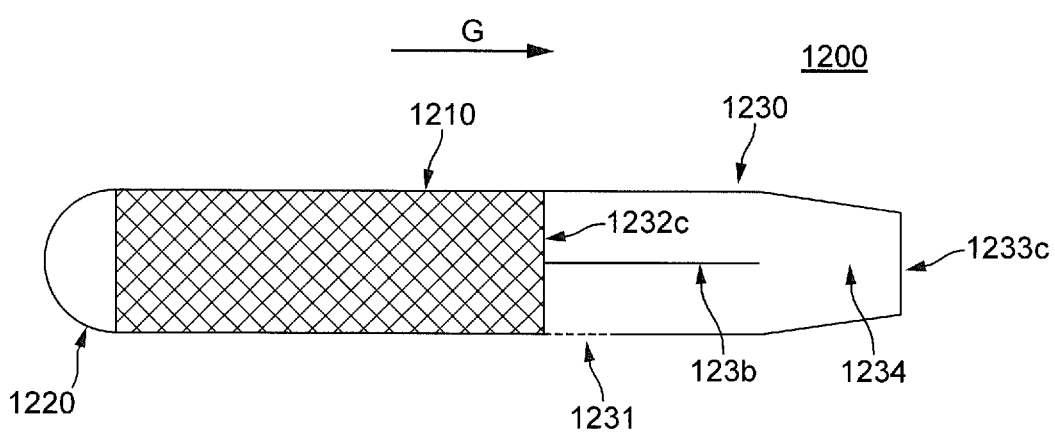
FIG. 12 shows a sound suppression apparatus in accordance with an eleventh embodiment of the present invention.

FIG. 12 shows an eleventh embodiment of the present invention similar to the embodiment of FIG. 4, in which the same or similar parts are represented by elements labelled 12XX where elements of the third embodiment are labelled 4XX, but in which an alternate configuration of partition member 1236 is used. In FIG. 12, partition member 1236 extends toward 1233c as a plate perpendicular to the plane of the page so as to divide void 1234 contained within housing 1230 into two intercommunicating voids. However, the configuration of FIG. 12 only exhibits a perforate opening 1231 on one side of the housing 1230 with respect to the direction of oncoming gas flow, such that the end of the side of the void 1234 on one side of partition 1236 communicates with the outer surface of the sound suppression device via perforate opening 1231 while the void on the other side is closed, the two voids communicating with each other since partition member 1236 does not extend so far as the tail end wall 1233c shown in FIG. 12. Partition structure 1236 generally has the form of a plate, and preferably extends the entire height of sound suppression apparatus 1200 in directions perpendicular to the plane of the page. The configuration of FIG. 12 has a similar effect to the configuration of FIG. 4, in that the resonant length of void 1234 is increased and the characteristic frequency is decreased.

Figure 13:
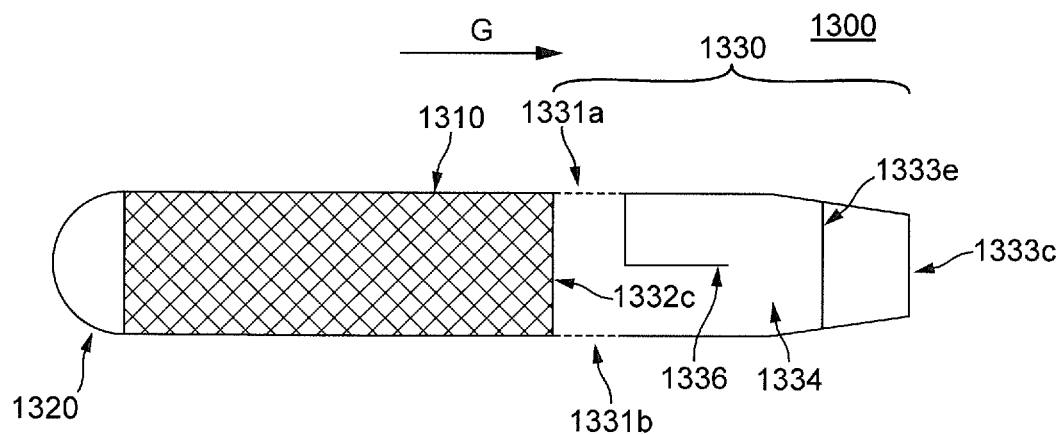
FIG. 13 shows a sound suppression apparatus in accordance with a twelfth embodiment of the present invention.

A twelfth embodiment of the present invention is shown in FIG. 13, in which the same or similar parts are represented by elements labelled 13XX where elements of the third embodiment are labelled 4XX. Sound suppression apparatus shown in FIG. 13 is similar to sound suppression apparatus 400 shown in FIG. 4 except that the resonant void 1334 defined within housing 1330 is shortened by an additional partition member 1333e, which is arranged extending above and below the plane of the page and across the cross-sectional width of void 1336 so as to shorten the resonant cavity provided by the void, relative to the length of the resonant cavity were partition member 1333e not present. The configuration of FIG. 13 permits the resonant frequency of the cavity to be increased without disrupting the aerodynamic advantages afforded by tapered housing section 1330. Partition member 1333e can be placed as far forward as is desired toward perforate openings 1331a and 1331b. Such a configuration can be especially adopted in configurations in which the tapered portion converges to a point in order to preserve resonance characteristics provided by a trailing end wall as set out above.

In some configurations, the further void provided between partition 1333e and trailing end wall 1333c can be used to provide a further reactive sound-attenuating element of the type shown in any of the preceding embodiments. Such a configuration having a further resonator can, in a similar manner to the eighth embodiment shown in FIG. 9, allow two frequencies to be addressed by two appropriately-tuned cavity resonators.

Figure 14:
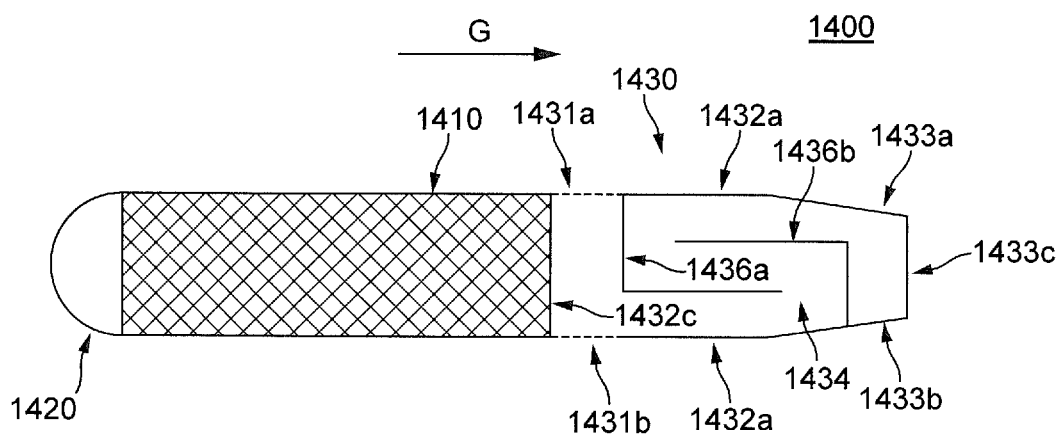
FIG. 14 shows a sound suppression apparatus in accordance with a thirteenth embodiment of the present invention.

FIG. 14 shows a thirteenth embodiment of the present invention, having a further modified resonator configuration within housing 1430. The configuration of FIG. 14 provides two L-shaped partition members 1434a, 1434b, one extending inwardly from wall 1432a and then extending rearwardly towards trailing end wall 1433c, the other extending inwardly from tapered wall 1433b towards tapered wall 1433a and then extending forwardly towards end wall 1432v. The effect of providing two partition members as shown in FIG. 14 is to lengthen the resonant path in resonant cavity 1434, thus allowing very low frequencies to be addressed. While partition members 1436a and 1436b are provided as L-plate members extending the full height of the sound suppression apparatus 1400 perpendicular to the plane of the page, other forms of resonator are possible, as one skilled in the art would appreciate.

FIGS. 1-14 illustrate many variants and configurations of hybrid sound suppression apparatuses having a combination of resistive sound-absorbing elements and reactive sound-attenuating elements and which suitable for installation inside a gas transport duct. For example, without limitation, other reactive sound absorbing structure such as a Helmholtz resonator, a side-channel, or an expansion region can be provided by the housing as the reactive sound absorbing element. As one skilled in the art will recognise, the various features described in each above embodiment can be combined, without limitation, to achieve the desired suppression of one or more predetermined characteristic frequencies as well as a broadband suppression.

Figure 15:
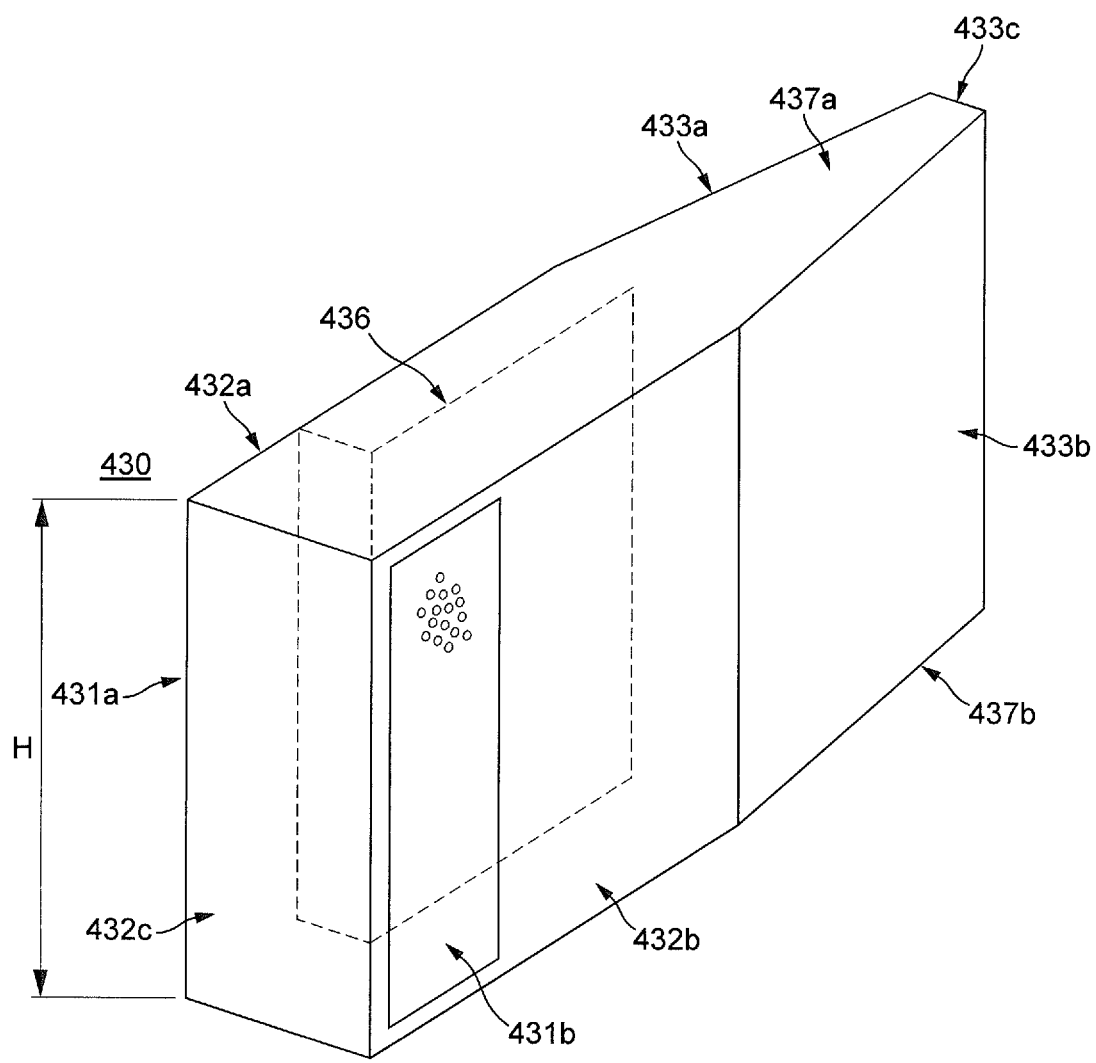
FIG. 15 shows an isometric view of the housing provided for the third embodiment.

Now with reference to FIG. 15, an exemplary process for constructing the housing 430 shown in FIG. 4 will be described. As shown in FIG. 15, housing 430 is defined by leading edge wall 432c, trailing edge wall 433c, first straight side wall 432a and second straight side wall 432b extending rearwardly from the side edges of leading edge wall 432c, and taper walls 433a and 433b respectively extending from a trailing edge end of walls 432a and 432b and terminating at trailing edge wall 433c. The top and bottom of housing 430 here are shown as top plate 437a, having a shape matching the plan profile of housing 430, and bottom plate 437a, having a corresponding profile. Inside void 434 defined by housing 430, L-shaped partition member 436 is provided extending from side wall 432a. Perforate portions 431a and 431b are provided as separate plate elements arranged within or to overlie corresponding openings at a leading edge end of straight wall portions 432a and 432b which communicate between the outer surface of housing 430 and void 434 defined within housing 430.

The configuration shown in FIG. 15 is suitable for use as a splitter in an appropriately-sized duct having a cross-sectional span similar to height H of the sound suppression apparatus shown in FIG. 15, or alternatively as a brick silencer in a duct having height greater than height H. If housing 430 shown in FIG. 15 is intended to be used in a splitter configuration, top and bottom plates 437a and 437b can be omitted, as the walls of the duct against which housing 430a is to be arranged may adequately seal the void 434, for example by welds. However, even a splitter configuration is desired, top and bottom plates 437a and 437b can be provided to improve structural integrity, to make installation easier, and to allow for thermal expansion of the duct cross-section.

Figure 16:
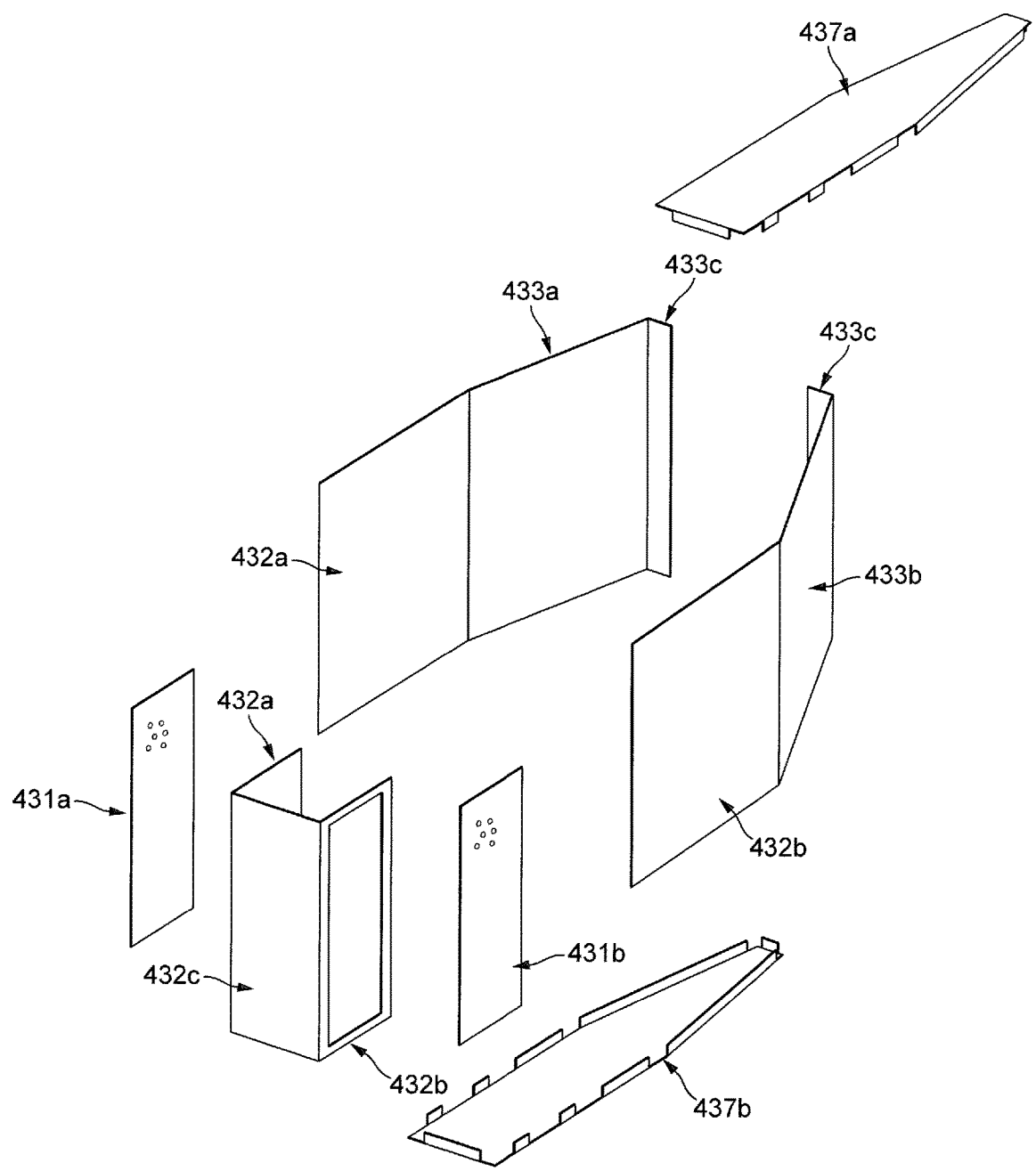
FIG. 16 shows an exploded view of the housing provided for the third embodiment.

FIG. 16 shows a construction process for the housing 43 shown in FIG. 15. Leading edge wall 432c is formed from bent sheet metal, such as steel sheet, together with the leading edge portions of walls 432b in which perforate portions 431a and 431b are arranged. Trailing edge portions of wall 432a are also formed from bent sheet metal together with tapered portion wall 433a and one half of trailing edge wall 433c. A corresponding portion is made of bent sheet metal comprising the trailing edge portion of wall 432b together with taper wall 433b and the other end of trailing edge wall 433e. Top and bottom plates 437a and 437b are formed of sheet metal with perpendicularly-formed tabs projecting inwards for welding with respective wall portions, so as to form a rigid and substantially air-tight enclosure, except for the permitted communication of air through porous panels 431a and 431b.

Figure 17:
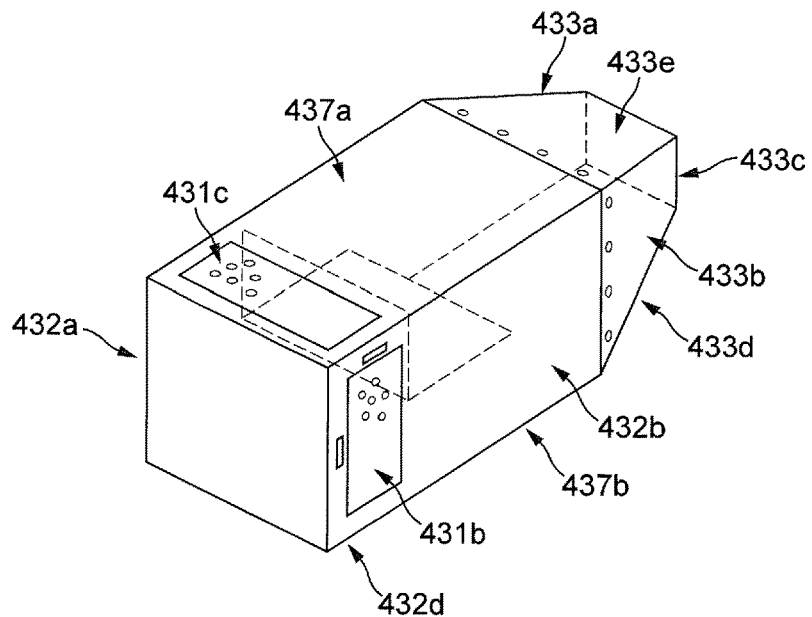
FIG. 17 shows an alternative configuration of the housing of the third embodiment, suitable for a brick configuration.
Figure 18:
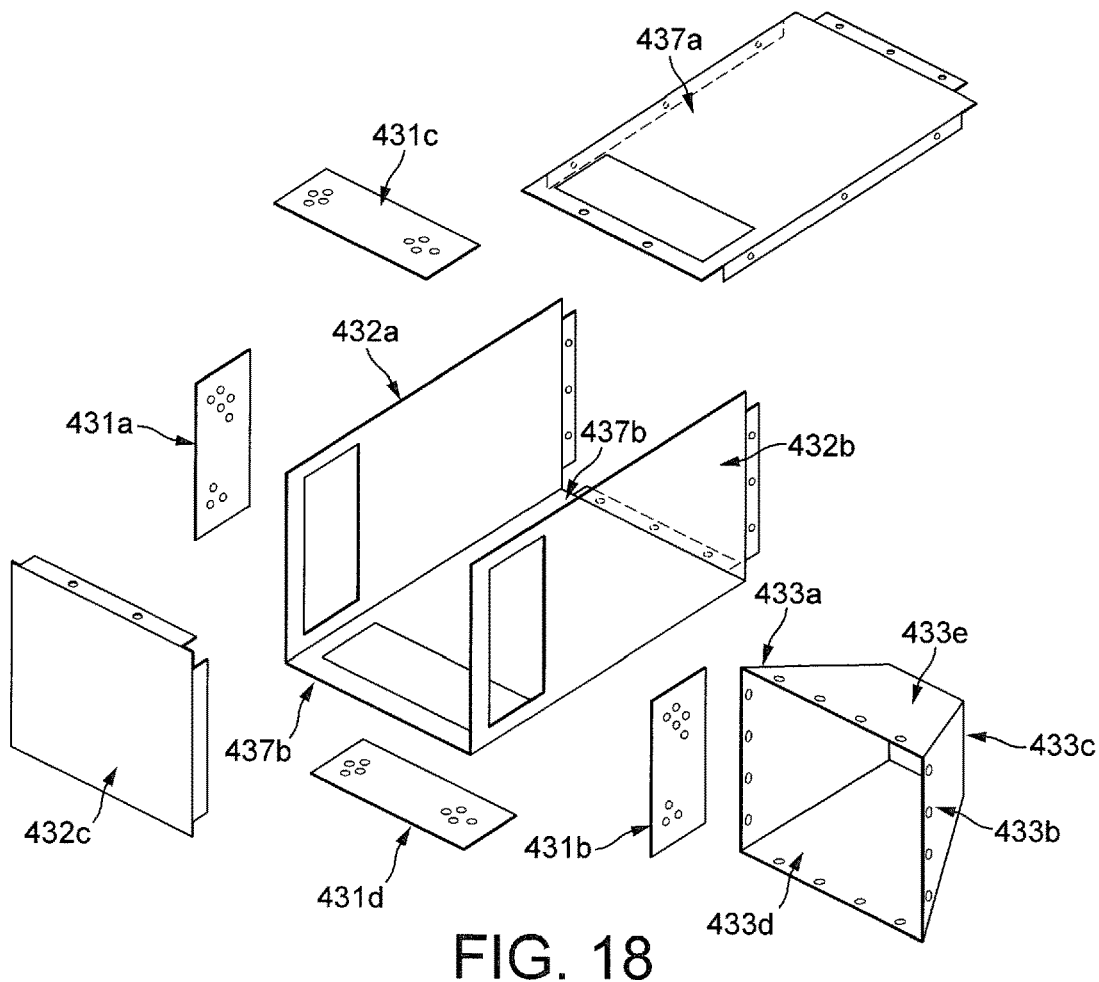
FIG. 18 shows an exploded view of the housing of FIG. 17.

FIG. 17 shows an alternative configuration of the arrangement of FIG. 15, which is particularly suitable for use in a brick configuration. In the configuration of FIG. 17, additional perforated panels 432c and 432d are provided in top and bottom plate 437a and 437b while trailing edge section 433 is formed as a truncated square-based pyramid with walls 433a, 433b, 433d and 433e converging at trailing end wall 433c. A configuration of FIG. 17 therefore has substantially symmetric external configuration with reflection symmetry about orthogonal planes (vertical and horizontal planes) including the longitudinal axis, such that the configuration of FIG. 17 has a rectangular profile when viewed from an oncoming direction of gas.

Figure 19:
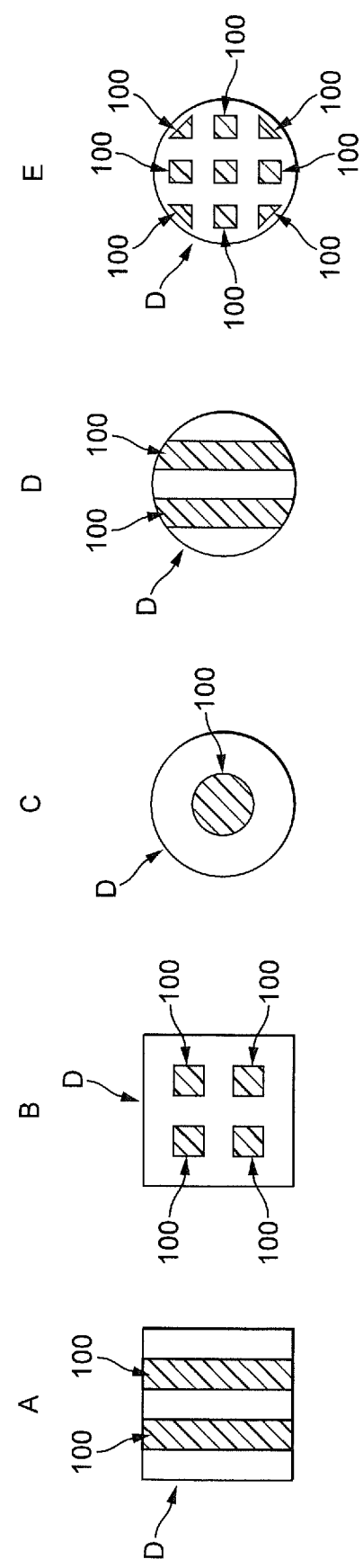
FIG. 19 shows a range of options for installation of the sound suppression apparatuses being embodiments of the present invention into various forms of ducting.

The sound suppression apparatuses of the present invention may be installed in ducts D in a variety of configurations, as shown in FIG. 19. Particularly, FIG. 19 shows a series of views in the gas transport direction along a variety of different types of ducts, having a variety of different sound suppression apparatus installed therein, the various sound suppression apparatus corresponding to embodiments and variants described above.

Configuration A of FIG. 19 shows two splitters arranged in a square duct. Configuration B of FIG. 19 shows four sound suppression apparatuses in brick form arranged in a square duct. Configuration C shows a circular brick (or pod) sound suppression apparatus arranged in a circular duct. Configuration D shows two sound suppression apparatuses in a splitter configuration arranged in a circular duct. Configuration E shows nine sound suppression apparatuses, five of which are of square brick configuration and four of which are of triangular brick configuration arranged within a round duct. Many other variants may be considered by the skilled person when putting the present invention into practice.

For improved effect, the sound suppression apparatuses should be arranged in correspondence with a propagation mode pattern for a frequency which the sound-suppression apparatuses are configured to attenuate.

At relatively low frequencies, when the half-wavelength of the sound wave is greater than the minimum cross-sectional dimension of the duct, the sound waves propagate in the duct as a plane wave. However, as the frequency increases, the half-wavelength of the sound wave decreases and it is possible for higher-order modes than the plane wave to propagate in the duct. Such higher-order modes propagate with a wavefront which has non-uniform pressure distributions in a plane perpendicular to the direction of propagation. Each higher-order mode has a particular cut-on frequency, which will depend on the dimensions and geometry of the duct.

Figure 20A:
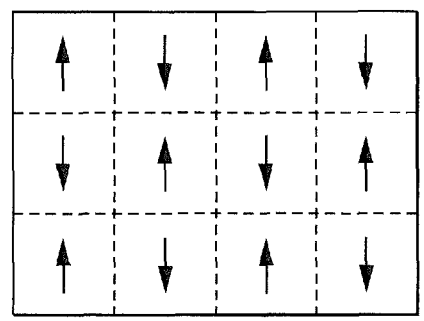
FIG. 20A shows a possible higher order mode pattern associated with a rectangular duct.

For example, FIG. 20A shows the pressure distribution across the wave-front of a particular higher-order mode of a rectangular duct, having 4 pressure antinodes arranged across the width of the duct and 3 pressure antinodes arranged across the height of the duct. The arrows show the pressure antinodes, while the edges of the boxes containing the arrows define the pressure nodes. The acoustic energy can be considered to transmit along the length of the duct through the centre of each box.

Prior-art approaches to using reactive sound-attenuating elements by incorporating them in the walls of the duct can be ineffective at attenuating sound propagating as higher-order modes, since when the higher-order modes propagate in the duct, the pressure antinodes may be away from the walls of the duct. Therefore, the reactive sound-suppression elements do not interact effectively with the propagating higher-order modes.

However, by using a sound-suppression apparatus in accordance with the present disclosure, the reactive sound-suppression elements can be provided so as to interact effectively with the propagating higher-order modes.

Specifically, by providing a plurality of sound-suppression apparatuses which are arranged in one dimension across the duct, the reactive sound-suppression elements can be provided so as to interact effectively with the propagating higher-order modes where many of the anti-nodes preferentially propagate away from the duct walls. In some configurations, the sound-suppression apparatuses are arranged in the duct to correspond to a higher-order mode pressure antinode distribution of a particular frequency of interest, which is a frequency which a sound-attenuation element of each sound-suppression apparatus is configured to attenuate. In some configurations, the sound-suppression apparatuses are arranged to have an equal spacing across the duct. In some configurations, the sound-suppression apparatuses can be arranged in two perpendicular dimensions across the duct. In other configurations, the sound-suppression apparatuses can be elongated in one dimension across the duct, and can comprise more than one resonant cavity to interact with a corresponding number of antinodes of the higher-order mode which is arranged in that dimension.

Each sound suppression apparatus can interact effectively with higher order modes which have reactive sound-attenuating element openings near to the locations of all pressure antinodes for the higher order mode. So, for example, in one-dimension, a single sound suppression apparatus centred in the duct, openings can be located close to, at most, 2 anti-nodes. Therefore, it can control higher order modes up to the second order effectively. Using two sound suppression apparatus' spaced across the duct, openings can be located to, at most, 4 anti-nodes. Therefore, higher order modes up to the fourth order can be effectively controlled. This approach can be generalised to two-dimensional arrangements of the sound suppression apparatuses and the respective reactive sound-attenuating elements.

Figure 20B:
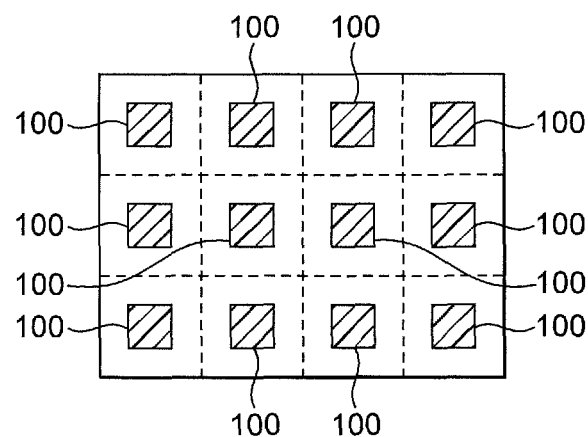
FIG. 20B shows one appropriate placement of embodiments of the present invention suitable for the mode pattern shown in FIG. 20A.

With reference again to the propagating higher-order mode pattern shown in FIG. 20A, FIG. 20B shows sound suppression apparatus being embodiments of the present invention in the form of brick baffles, with each sound suppression apparatus being placed at each antinodal position of the propagating higher-order mode of FIG. 20A, the reactive sound-attenuating element of the sound suppression apparatus then being appropriately tuned to attenuate that frequency, for example being a harmonic of a resonant cavity incorporated in each sound suppression apparatus. Such a configuration can effectively attenuate frequencies that allow the mode shown in FIG. 20A to propagate. Additionally, such a configuration can also attenuate other higher-order modes, including all relatively lower-order modes than that shown in FIG. 20A, provided that such modes also correspond to a harmonic of the resonant cavity.

In an alternative configuration, as previously described with reference to FIG. 2, each sound suppression apparatus can be provided in the form of, for example, vertical splitter baffles having internal plates dividing the resonator void into plural voids arranged, for example, vertically, so as to provide an arrangement of reactive sound-attenuating elements which corresponds to vertical mode pattern in the duct. Further, such sound suppression apparatuses in the form of, for example, vertical splitter baffles could then be arranged, for example, horizontally across the duct to correspond to a desired mode pattern in the duct. Of course, the term vertical here is used to provide a convenient reference frame, and the baffles may be arranged at any appropriate orientation within the duct. Where the duct is rectangular, arrangement of the splitter baffles perpendicular to one opposing pair of walls of the duct and parallel to the other opposing pair of walls can be especially effective in controlling the higher order modes as described above.

In the case of a rectangular duct, it can be effective to provide that any sound suppression apparatuses arranged between the sound suppression apparatuses nearest to the walls of the duct are arranged at a spacing of one wavelength of the highest frequency targeted for control by the reactive element.

One approach to the arrangement of the sound-suppression apparatuses according to the present disclosure is to identify the highest frequency which the reactive element is desired to attenuate and calculate the corresponding highest cut-on mode at this frequency. The sound-suppression apparatuses, having reactive sound-attenuating elements which are tuned to attenuate that mode, for example, as a fundamental or harmonic mode of the reactive sound-attenuating element, are then arranged within the duct in a spatial pattern which corresponds to that mode. At least that frequency, and all frequencies below, will then efficiently be attenuated.

For example, in a 2.5 m by 2.5 m square duct, the cut-on frequency for the propagation of higher order modes is typically at around 100 Hz. Using a conventional resonator in the wall of the duct and tuned for 31 Hz as a fundamental frequency, the resonator would attenuate frequencies at 31 Hz and each harmonic multiple of 31 Hz, but would do so inefficiently at the harmonics above 100 Hz, since these harmonics will be above the cut-on frequency for higher order modes. In contrast, by using a pair of sound-suppression apparatuses in accordance with the present disclosure each having a reactive sound-attenuating element tuned for 31 Hz and being arranged across centre of the duct to correspond to the second-order propagating mode pattern, the harmonics up-to the cut-on frequency for the third order propagating mode pattern would be effectively controlled, therefore extending the working frequency range of the resonator. This principle can be extended by changing the number and arrangement of resonators for increasingly higher mode orders.

Also, for improved effect, the sound suppression apparatuses may be arranged at a maximum amplitude or antinodal point of a resonant mode pattern formed along the length of the duct for the frequency of interest. Particularly, the opening of each respective reactive sound-suppression element may be arranged at or near a pressure anti-nodal point of the frequency of interest along the length of the duct. Where the open end of the duct defines a pressure node of the wavelength of interest, the opening of the reactive sound-suppression elements may be arranged at a pressure antinode of the wavelength of interest relative to this node, for example, at odd multiples of the wavelength associated with the frequency of interest from the open end of the duct.

Figure 21:
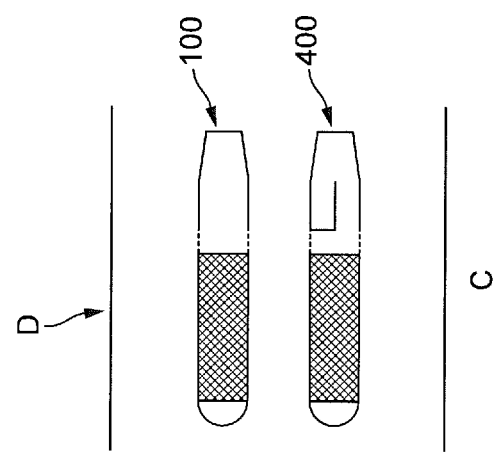
FIG. 21 shows ways in which embodiments of the present invention may be combined in a duct to provide sound suppression at a broader range of frequencies.
Figure 21:
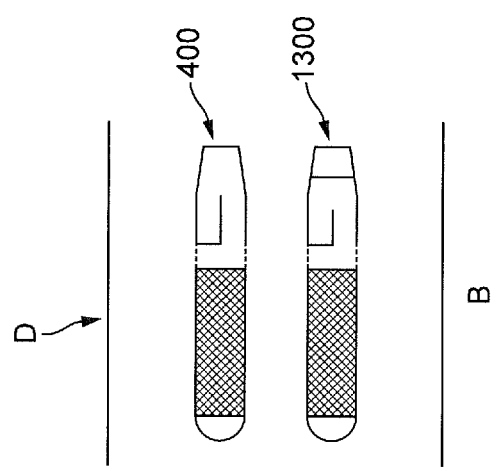
Figure 21:
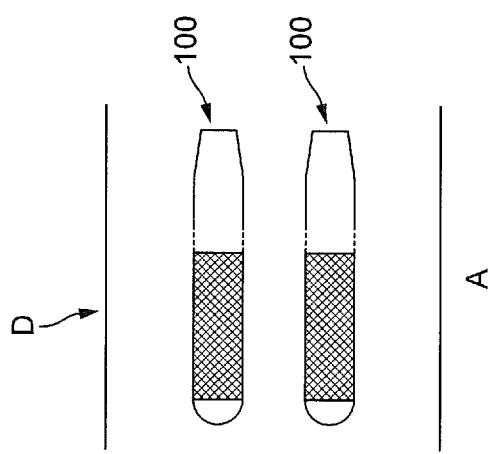

Furthermore, as shown in FIG. 21, two or more sound suppression apparatuses may be placed within a duct, the reactive sound-attenuating element of each sound suppression apparatus being tuned to absorb a different resonant frequency. In configuration A shown in FIG. 21, two sound suppression apparatuses 100 in accordance with a first embodiment of the present invention, shown in FIG. 1, are provided in parallel. One of the sound absorbers is provided with a longer resonant cavity by extending the housing relatively more rearward than the other. This allows the sound suppression apparatuses to be tuned to different frequencies, thereby achieving a broader range of frequency suppression overall.

The configuration as shown in Figure B has the same intent as the configuration of Figure A, except that the first sound absorbing apparatus 400 is in accordance with FIG. 4, while the second sound absorbing apparatus 1300 is in accordance with FIG. 13. The apparatus 400 in accordance with FIG. 13 has a second partition member which shortens the resonant cavity. Therefore, for a sound-absorbing apparatus having the same overall dimensions, the sound suppression apparatus 1300 shown in configuration B of FIG. 21 has a relatively higher frequency than sound suppression apparatus 400 shown in configuration B of FIG. 21.

In configuration C shown in FIG. 21, two sound suppression apparatuses are provided, one sound suppression apparatus 100 being in conformity with FIG. 1 and another sound suppression apparatus 400 being in conformity with FIG. 4. For the same overall external configuration, the sound suppression apparatus 400 having the additional partition member 436 has a relatively longer resonant cavity and a relatively lower resonant frequency.

Figure 22:
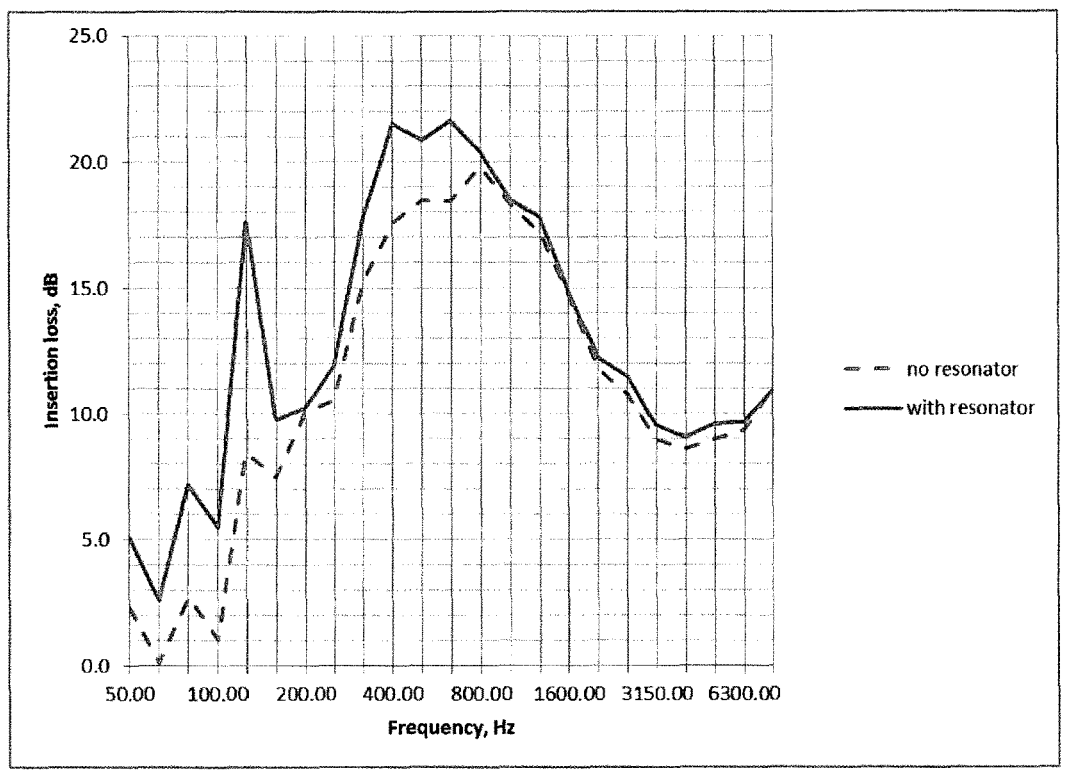
FIG. 22 shows comparative test data comparing a resistive baffle configuration with a sound suppression apparatus in accordance with an embodiment of the present invention.

FIG. 22 shows a comparison of sound suppression ability between a duct containing a normal dissipative baffle as shown in FIG. 25 compared with a sound suppression apparatus as shown in FIG. 4 having the resonant cavity tuned for 125 Hz. As can be seen from FIG. 23, the resonator provides an additional resonant absorbent peak at 125 Hz, but also contributes to a general enhancement of the broad-band performance between 200 and 3000 Hz, resulting in an overall much-improved performance without significant additional disadvantageous effect on the airflow past the baffle.

Figure 23:
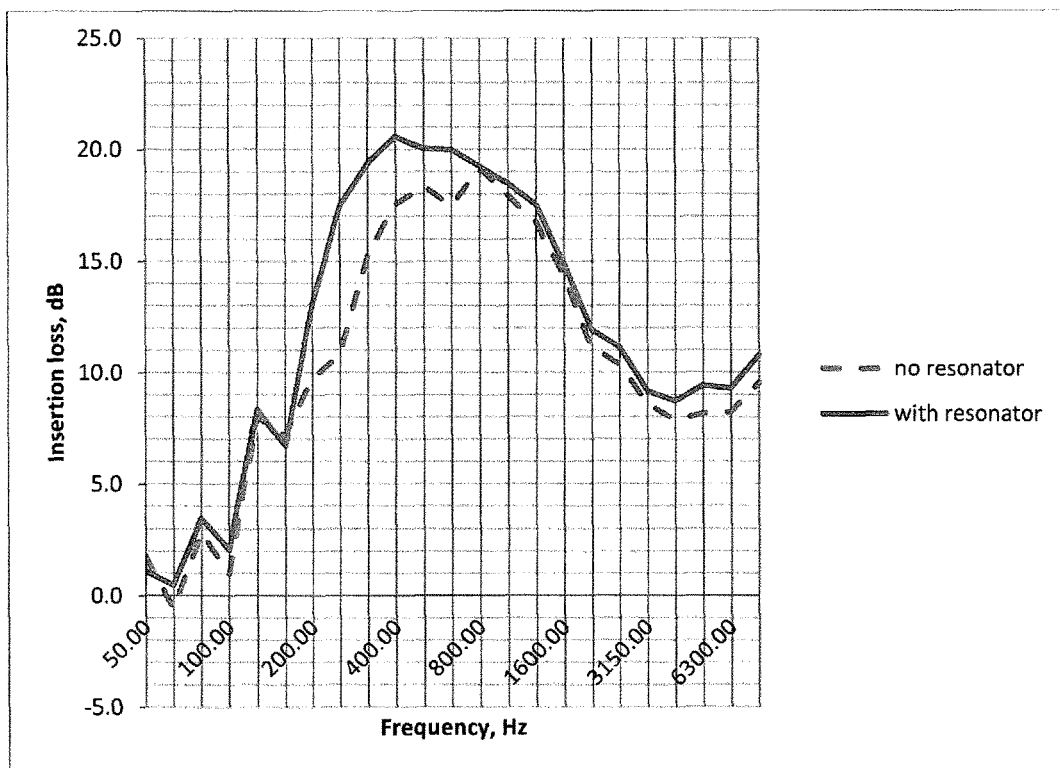
FIG. 23 shows comparative test data comparing a pair of resistive baffles with a pair of sound suppression apparatuses in accordance with an embodiment of the present invention being tuned at neighbouring third octaves.
Figure 24:
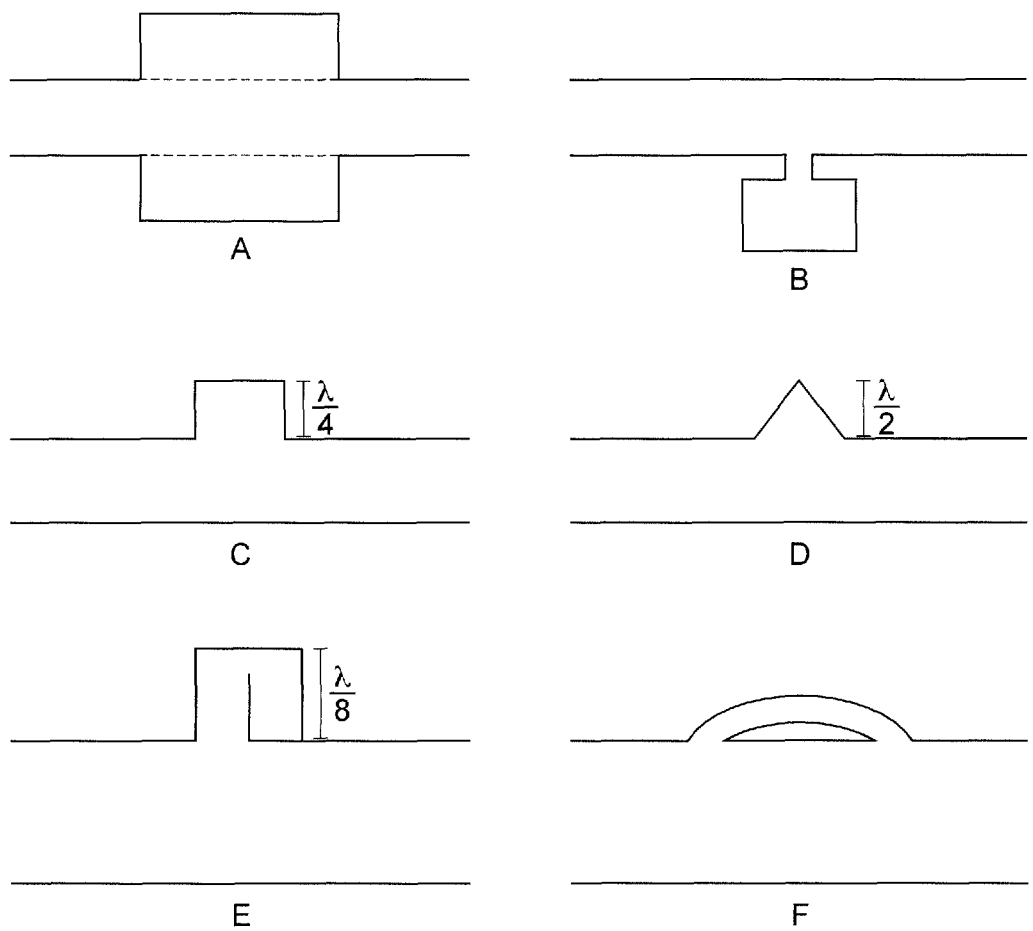
FIG. 24 shows different types of reactive sound-attenuating elements as known in the art.

FIG. 23 shows a comparison between a pair of normal dissipative baffle as shown in FIG. 25 with a pair of sound suppression apparatuses in accordance with FIG. 4, one of which being tuned to a characteristic frequency of 175 Hz, the other being tuned to a characteristic frequency of 250 Hz, one-third octave apart from the 175 Hz resonator. In the configuration of FIG. 23, an overall significantly enhanced broad-band performance is achieved as compared with the conventional dissipative baffles.

When both resistive and reactive sound-attenuating elements are provided in a single sound suppression apparatus as herein disclosed, both resistive and reactive sound-attenuating elements are able to interact with the gas stream passing the outer surface of the apparatus. The resistive and reactive sound-attenuating elements provide interacting effects on this gas stream such that a sound suppression performance which exceeds the individual contributions expected from resistive or reactive elements alone can be obtained.

Without wishing to be bound by any hypothesis, it is presently believed that reactive elements, which are relatively more efficient at reducing specific low frequencies, may operate less efficiently on a gas stream containing sound waves which are non-planar and which have a relatively greater higher-order mode content. The provision of a resistive element, which more readily attenuates higher-order modes than the fundamental, can reduce the higher-order modes propagating in the duct and can therefore allow the reactive element to operate in relatively more ideal conditions. Such an effect is especially achievable when the reactive element is located downstream in the direction of gas flow relative to the location of the resistive element, since when the reactive element is placed downstream of the resistive element, the reactive element can generate a local pressure minimum and hence a local velocity maximum. This local velocity maximum is believed to increase the damping of the dissipative elements.

Further, when the resistive and reactive elements interact with the gas stream via a common external surface of the apparatus, the aerodynamic properties of the apparatus as a whole can be selected so as to provide enhanced sound suppression performance while minimising unwanted disruption to a passing gas stream. Such a configuration can further enhance the synergistic effect of the reactive and resistive elements, since no disruptive element is provided in the gas flow between the reactive and resistive elements. Additionally, such a configuration can avoid unnecessarily increasing flow speeds in the duct and can therefore avoid additional flow noise generation and undesired pressure drop.

Finally, the higher harmonics of the reactive elements can have an appreciable effect in improving the overall attenuation in a mid-frequency range low-frequency attenuation associated with the reactive elements.

When applying the teaching of the present disclosure, it may be assumed for common applications when adjusting the dimensions and geometry of the sound suppression apparatus to achieve aerodynamic or laminar flow and when adjusting the dimensions and geometry of the reactive sound-attenuating element to achieve a desired resonant frequency that the gas is air at standard temperature and pressure, namely a temperature of 25° C. and a pressure of 100 kPa, flowing at 50 m/s. However, the present disclosure can be applied to flows of other gases under other conditions, without limitation.

When providing ducts for typical gas-turbine applications, the ducts can be considered to have a maximum cross-sectional dimension between 1 m to 9 m, although the present disclosure can be applied to other duct configurations, without limitation.

The embodiments of the present invention can be made relatively straightforward to fit to existing ducts and can be manufactured to correspond to standardised duct dimensions for installation into new projects without increasing the dimensions, weight or complexity of the duct itself. Furthermore, where changes in equipment performance, the replacement of equipment, or a change in regulatory requirements require a change in the sound suppression capabilities of existing ducting, the embodiments of the present invention can provide an effective retro-fitted solution. The embodiments of the present invention can be manufactured so as to occupy a volume and provide a flow resistance not significantly greater than that of a resistive baffle, while providing improved sound suppression performance.

Naturally, one skilled in the art would be able to adapt the present disclosure to a variety of situations without undue experimentation, to achieve a solution which fits his own particular engineering requirements, using such materials and techniques as may be available in the art.

Accordingly, the above-described embodiments should not be seen as limiting the present invention, but are to be regarded merely as exemplary. The scope of the present invention is accordingly defined by the appended claims.

The invention claimed is:

1. A sound suppression apparatus for installation inside a gas transport duct, the sound suppression apparatus comprising:
   a resistive sound-absorbing element; and
   a housing providing a reactive sound-attenuating element communicating with a surrounding of the apparatus via an opening in an outer surface of the housing;
   wherein:
   the sound suppression apparatus has an elongate form in a longitudinal direction from a first end of the sound suppression apparatus to a second end of the sound suppression apparatus;
   an outer surface of the sound suppression apparatus is shaped to provide aerodynamic gas flow from a first end to a second end of the sound suppression apparatus;
   the housing has a profile in a plane including the longitudinal direction which tapers in the longitudinal direction towards the second end of the sound suppression apparatus;
   the outer surface of the sound suppression apparatus comprises an outer surface of the resistive sound-absorbing element and the outer surface of the housing; and
   the resistive sound-absorbing element is arranged relatively closer to the first end of the sound suppression apparatus than the housing.

2. The sound suppression apparatus according to claim 1, wherein the housing extends from the resistive sound-absorbing element.

3. The sound suppression apparatus according to claim 1, wherein the outer surface of the sound suppression apparatus has reflection symmetry about a first plane including the longitudinal direction, wherein the resistive sound-absorbing element provides a resistive sound-absorbing surface on both sides of the first plane, and
wherein the housing provides a reactive sound-attenuating element communicating with an outer surface of the housing on either one side, or both sides, of the first plane.

4. The sound suppression apparatus according to claim 3,
wherein the outer surface of the sound suppression apparatus has symmetry about a second plane including the longitudinal direction and being perpendicular to the first plane,
wherein the resistive sound-absorbing element provides a resistive sound-absorbing surface on both sides of the second plane, and
wherein the housing provides a reactive sound-attenuating element communicating with an outer surface of the housing on either one side, or both sides, of the second plane.

5. The sound suppression apparatus according to claim 1, wherein the resistive sound absorbing element comprises a mass of sound-absorbing material.

6. The sound suppression apparatus according to claim 1, wherein the resistive sound absorbing element comprises at least one layer of sound-absorbing material supported by a supporting member.

7. The sound suppression apparatus according to claim 1; wherein the reactive sound-attenuating element comprises a cavity of the housing.

8. The sound suppression apparatus according to claim 1, wherein the opening of the housing is provided with a perforate portion arranged to cover or lie within the opening.

9. The sound suppression apparatus according to claim 8, wherein the outer surface of the housing comprises the perforate portion.

10. The sound suppression apparatus according to claim 7, wherein the cavity of the housing is provided with a partition member for setting a characteristic frequency of the reactive sound-attenuating element to a predetermined value.

11. The sound suppression apparatus according to claim 10, wherein the partition member is arranged to divide the cavity into a closed-ended portion and an open-ended portion which communicate with each other, the open-ended portion communicating with the opening of the housing.

12. The sound suppression apparatus according to claim 11, wherein the partition member is an L-shaped plate.

13. The sound suppression apparatus according to claim 7, wherein the reactive sound-attenuating element comprises a plurality of cavities of the housing, each communicating with a respective opening of the housing.

14. The sound suppression apparatus according to claim 7, wherein the reactive sound-attenuating element comprises a cavity of the housing which communicates with a plurality of openings of the housing.

15. The sound suppression apparatus according to claim 1, comprising a cap portion arranged at a first end of the sound suppression apparatus to provide a convex end surface to the sound suppression apparatus.

16. The sound suppression apparatus according to claim 15, wherein the cap portion provides a curved end surface to the sound suppression apparatus.

17. The sound suppression apparatus according to claim 1, wherein the resistive sound-absorbing element comprises at least one of a porous, fibrous, foamed or granular sound-absorbing material.

18. The sound suppression apparatus according to claim 1, wherein the reactive sound-attenuating element is a resonant cavity.

19. A gas transport duct, comprising:
an enclosed channel defining a passage for transporting gas; and
at least one sound suppression apparatus according to claim 1 arranged in the passage such that transported gas flowing in the tube will interact with the resistive sound absorbing element and the reactive sound-attenuating element.

20. The gas transport duct according to claim 19, wherein the at least one sound suppression apparatus is arranged in the passage so as to divide the passage into at least two sub-passages.

21. The gas transport duct according to claim 19, wherein the at least one sound suppression apparatus comprises a plurality of sound suppression apparatuses and at least two of the sound suppression apparatuses are provided with respective reactive sound-attenuating elements having different characteristic frequencies.

22. The gas transport duct according to claim 21, wherein the different characteristic frequencies are related by one-third of an octave.

23. The gas transport duct according to claim 19, wherein the at least one sound suppression apparatus is arranged in the passage such that a plurality of reactive sound-attenuating elements are provided at positions across the passage which correspond to a higher-order propagating mode pattern of the passage and to a fundamental or harmonic characteristic frequency of the reactive sound-attenuating elements.

24. The sound suppression apparatus according to claim 8, wherein the cavity of the housing is provided with a partition member for setting a characteristic frequency of the reactive sound-attenuating element to a predetermined value.

25. The sound suppression apparatus according to claim 24, wherein the partition member is arranged to divide the cavity into a closed-ended portion and an open-ended portion which communicate with each other, the open-ended portion communicating with the opening of the housing.

26. The sound suppression apparatus according to claim 25, wherein the partition member is an L-shaped plate.

27. The sound suppression apparatus according to claim 8, wherein the reactive sound-attenuating element comprises a plurality of cavities of the housing, each communicating with a respective opening of the housing.

28. The sound suppression apparatus according to claim 8, wherein the reactive sound-attenuating element comprises a cavity of the housing which communicates with a plurality of openings of the housing.

29. The sound suppression apparatus according to claim 1, wherein the resistive sound-absorbing element comprises a straight portion in which opposing sides of the resistive sound-absorbing element are parallel.

30. The sound suppression apparatus according to claim 5, further comprising a cap portion arranged relatively closer to the first end of the sound suppression apparatus than the resistive sound-absorbing element, wherein the cap portion does not comprise the sound-absorbing material.

31. The sound suppression apparatus according to claim 1, wherein the sound suppression apparatus has a convex end surface at the first end and wherein the housing tapers to a point, a flat surface, or a convex surface at the second end.

32. The gas transport duct according to claim 19, wherein the at least one sound suppression apparatus is arranged with the longitudinal direction in a direction of gas flow along the duct.

\* \* \* \* \*